United States Patent
Futaki et al.

(10) Patent No.: US 12,356,273 B2
(45) Date of Patent: Jul. 8, 2025

(54) DISTRIBUTED UNIT, CENTRAL UNIT, RADIO ACCESS NETWORK NODE, AND METHOD THEREFOR

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/904,193

(22) Filed: Oct. 2, 2024

(65) Prior Publication Data

US 2025/0024342 A1 Jan. 16, 2025

Related U.S. Application Data

(63) Continuation of application No. 17/420,980, filed as application No. PCT/JP2019/042894 on Oct. 31, 2019, now abandoned.

(30) Foreign Application Priority Data

Jan. 11, 2019 (JP) .................................. 2019-003562

(51) Int. Cl.
*H04W 36/32* (2009.01)
*H04W 36/00* (2009.01)
(Continued)

(52) U.S. Cl.
CPC ....... *H04W 36/32* (2013.01); *H04W 36/0058* (2018.08); *H04W 36/00837* (2018.08); *H04W 36/00838* (2023.05); *H04W 36/08* (2013.01); *H04W 36/26* (2013.01); *H04W 36/362* (2023.05); *H04W 76/30* (2018.02); *H04W 36/328* (2023.05)

(58) Field of Classification Search
CPC . H04W 36/0058; H04W 36/08; H04W 36/26; H04W 36/32; H04W 76/30
See application file for complete search history.

(56) References Cited

U.S. PATENT DOCUMENTS

2014/0126545 A1   5/2014  Tamura et al.
2018/0227805 A1*  8/2018  Jang ..................... H04W 28/26
(Continued)

FOREIGN PATENT DOCUMENTS

JP      2015-005872 A    1/2015
WO      2013/024574 A1   2/2013
(Continued)

OTHER PUBLICATIONS

International Search Report for PCT Application No. PCT/JP2019/042894, mailed on Dec. 10, 2019.
(Continued)

*Primary Examiner* — Brian P Cox
(74) *Attorney, Agent, or Firm* — Sughrue Mion, PLLC

(57) ABSTRACT

A Distributed Unit (DU) (2) of a base station sends a first message to a Central Unit (1) of the base station in response to detecting initiation of a conditional mobility of a radio terminal (3) from a first cell served by the DU (2) to a second cell. It is thus for example possible to allow a Central Unit (CU) to be aware of satisfaction of an execution condition of a conditional mobility (or initiation of the conditional mobility).

6 Claims, 19 Drawing Sheets

(51) Int. Cl.
*H04W 36/08* (2009.01)
*H04W 36/26* (2009.01)
*H04W 36/36* (2009.01)
*H04W 76/30* (2018.01)

(56) References Cited

U.S. PATENT DOCUMENTS

| | | | |
|---|---|---|---|
| 2018/0368109 | A1 | 12/2018 | Kim |
| 2020/0120572 | A1* | 4/2020 | Fiorani ............... H04W 36/06 |
| 2021/0029600 | A1* | 1/2021 | Balan ............... H04W 36/305 |

FOREIGN PATENT DOCUMENTS

| | | |
|---|---|---|
| WO | 2014/166457 A2 | 10/2014 |
| WO | 2018/156696 A1 | 8/2018 |

OTHER PUBLICATIONS

Intel Corporation, "Discussion of conditional handover", 3GPP TSG RAN WG2 Meeting #104, R2-1816691, Spokane, USA, Nov. 8-12, 2018, pp. 1-4.
Media Tek Inc., "Conditional Handover Procedures", 3GPP TSG-RAN WG2 Meeting #104, R2-1816959, Spokane, WA, USA, Nov. 12-16, pp. 1-6.
Huawei, "Downlink Flow control for EN-DC", 3GPP TSG-RAN WG3 #NR2 Ad-Hoc, R3-172456, Qingdao, China, Jun. 27-29, 2017.
Extended European Search Report for EP Application No. 19908833.7 dated on Feb. 3, 2022.
3rd Generation Partnership Project, "Technical Specification Group Radio Access Network; NGRAN; Architecture description (Release 15)", 3GPP TS 38 401 V15.4.0, Dec. 31, 2018, pp. 1-40.
Extended European Search Report for EP Application No. 21202622.3 dated on Feb. 14, 2022.
Intel Corporation, "Analysis of conditional handover", 3GPP Draft; 3GPP TSG RAN WG2 Meeting #97bis, R2-1703415, Apr. 3, 2017.
"3rd Generation Partnership Project; Technical Specification Group Radio Access Network; NG-RAN; F1 application protocol (F1AP) (Release 15)", 3GPP TS 38.473 V15.4.0 (Dec. 2018), Jan. 8, 2019.
Japanese Office Communication for JP Application No. 2021-156753 mailed on Nov. 1, 2022 with English Translation.
Ericsson, Intra-gNB-CU mobility procedures, 3GPP TSG RAN WG3 #97bis, R3-173967, Sep. 29, 2017.
LG Electronics Inc., Issues on inter-gNB-DU mobility procedure, 3GPP TSG RAN WG3 #97bis, R3-173786, Sep. 30, 2017.
Ericsson, Resolve FFS in procedures in TS 38.401, 3GPP TSG RAN WG3 #99bis, R3-182234, Apr. 7, 2018.
U.S. Office Action for U.S. Appl. No. 17/493,979, mailed on Oct. 12, 2023.
Tayyab et al., "A Survey on Handover Management: From LTE to NR," in IEEE Access, vol. 7, pp. 118907-118930, 2019, doi:10.1109/ACCESS.2019.2937405(Year:2019).
JP Official Communication for JP Application No. 2022-188930, mailed on Oct. 31, 2023 with English Translation.
Nokia, Nokia Shanghai Bell, RRC Container exchange in UE Context Management, 3GPP TSG RAN WG3 #98 R3-174367, Dec. 1, 2017.
Samsung, KT, Mobility procedures with high layer split, 3GPP TSG RAN WG3 #98 R3-174611, Dec. 1, 2017.
CATT, Discussion on UE Context Management, 3GPP TSG RAN WG3 #96 R3-171458, May 19, 2017.
CATT, L2 Behaviors in NR Handover or Reconfiguration, 3GPP TSG RAN WG2 #97 R2-1700984, Feb. 17, 2017.

* cited by examiner

Fig. 16

| | Bits | | | | | | | | Number of Octets |
|---|---|---|---|---|---|---|---|---|---|
| 7 | 6 | 5 | 4 | 3 | 2 | 1 | 0 | | |
| PDU Type (=1) | | | Spare | Highest Trans- mitted NR PDCP SN Ind | Highest Deliv- ered NR PDCP SN Ind | Final Frame Ind | Lost Packet Report | | 1 |
| Spare | | | Condi- tional Handover Met 1601 | Data rate Ind | Highest Retrans- mitted NR PDCP SN Ind | Highest Deliv- ered Retrans- mitted NR PDCP SN Ind | Cause Report | | 1 |
| Desired buffer size for the data radio bearer | | | | | | | | | 4 |
| Desired Data Rate | | | | | | | | | 0 or 4 |
| Number of lost NR-U Sequence Number ranges reported | | | | | | | | | 0 or 1 |
| ... | | | | | | | | | ... |

DISTRIBUTED UNIT, CENTRAL UNIT, RADIO ACCESS NETWORK NODE, AND METHOD THEREFOR

CROSS-REFERENCE TO RELATED APPLICATIONS

The present application is a continuation application of U.S. patent application Ser. No. 17/420,980 filed on Jul. 6, 2021, which is a National Stage Entry of international application PCT/JP2019/042894, filed Oct. 31, 2019, which claims the benefit of priority from Japanese Patent Application 2019-003562 filed on Jan. 11, 2019, the disclosures of all of which are incorporated in their entirety by reference herein.

TECHNICAL FIELD

The present disclosure relates to a radio communication system and, in particular, to mobility of radio terminals.

BACKGROUND ART

Non Patent Literatures 1 and 2 disclose a conditional handover (CHO) being discussed in the 3GPP. In some implementations for CHO, a source radio access network (RAN) node (e.g., eNodeB (eNB)) transmits a handover command including a handover execution condition (e.g., threshold) to a radio terminal (e.g., User Equipment (UE)). The radio terminal maintains the connection with the source RAN node even after receiving the handover command, and initiates access to the target RAN node as soon as the condition configured by the handover command is satisfied. That is, the conditional handover (CHO) is different from existing handovers in that the radio terminal initiates access to the target cell not in response to receiving the handover command, but in response to the satisfaction of the condition configured by the handover command.

The CHO can improve the reliability of delivery of the handover command to the UE by early event triggering (i.e., lowering a threshold for triggering a measurement report by the radio terminal). This allows the CHO to reduce a handover failure rate.

In CHO, a configuration of a plurality of candidate target cells may be sent to the radio terminal. The candidate target cells may be referred to as potential target cells. For example, the radio terminal receives a handover command including configurations of a plurality of candidate target cells and a CHO execution threshold from a source RAN node (e.g., eNB). The radio terminal performs (or starts) measurements of the configured candidate target cells and, when the measurement in any candidate target cell meets the CHO execution threshold, initiates access (e.g., random access) to this candidate cell.

CITATION LIST

Non Patent Literature

[Non Patent Literature 1] Intel Corporation, "Discussion of conditional handover", R2-1816691, 3GPP TSG RAN WG2 Meeting #104, Spokane, WA, USA, Nov. 12-16, 2018

[Non Patent Literature 2] MediaTek Inc., "Conditional Handover Procedures", R2-1816959, 3GPP TSG RAN WG2 Meeting #104, Spokane, WA, USA, Nov. 12-16, 2018

SUMMARY OF INVENTION

Technical Problem

The inventors have studied applying conditional mobility including a conditional handover to a cloud RAN (C-RAN) deployment and found various problems. In the C-RAN, a base station (e.g., eNB or NR gNodeB (gNB)) includes a Central Unit (CU) and one or more Distributed Units (DUs). The C-RAN may be referred to as Centralized RAN or CU-DU split architecture.

For example, when a conditional mobility (e.g., conditional handover) is applied to the CU-DU split architecture, it is not clear how the CU knows satisfaction of an execution condition of the conditional mobility (or initiation of the conditional mobility).

One of the objects to be attained by embodiments disclosed herein is to provide apparatuses, methods, and programs that contribute to allowing a Central Unit (CU) to be aware of satisfaction of an execution condition of a conditional mobility (or initiation of the conditional mobility). It should be noted that this object is merely one of the objects to be attained by the embodiments disclosed herein. Other objects or problems and novel features will be made apparent from the following description and the accompanying drawings.

Solution to Problem

In a first aspect, a distributed unit of a base station includes at least one memory and at least one processor coupled to the at least one memory. The at least one processor is configured to send a first message to a central unit of the base station in response to detecting initiation of a conditional mobility of a radio terminal from a first cell served by the distributed unit to a second cell.

In a second aspect, a method for a distributed unit of a base station includes sending a first message to a central unit of the base station in response to detecting initiation of a conditional mobility of a radio terminal from a first cell served by the distributed unit to a second cell.

In a third aspect, a central unit of a base station includes at least one memory and at least one processor coupled to the at least one memory. The at least one processor is configured to control a conditional mobility of a radio terminal from a first cell served by the distributed unit to a second cell, and receive from the distributed unit a first message which the distributed unit sends in response to detecting initiation of the conditional mobility.

In a fourth aspect, a method for a central unit of a base station includes controlling a conditional mobility of a radio terminal from a first cell served by the distributed unit to a second cell, and receiving from the distributed unit a first message which the distributed unit sends in response to detecting initiation of the conditional mobility.

In a fifth aspect, a program includes instructions (software codes) that, when loaded into a computer, cause the computer to perform the method according to the above-described second or fourth aspect.

Advantageous Effects of Invention

According to the above-deceived aspects, it is possible to provide apparatuses, methods, and programs that contribute to allowing a Central Unit (CU) to be aware of satisfaction of an execution condition of a conditional mobility (or initiation of the conditional mobility).

BRIEF DESCRIPTION OF DRAWINGS

FIG. 16 is a diagram showing a specific example of a format of a DOWNLINK DATA DELIVERY STATUS frame according to a ninth embodiment;

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on the 3GPP Long Term Evolution (LTE) systems and 5G systems. However, these embodiments may be applied to other radio communication systems supporting mobility or a radio terminal (e.g., handover). Note that, the term "LTE" used in this specification includes enhancement/evolution of LTE and LTE-Advanced to provide interworking with the 5G System, unless otherwise specified. The 5G system includes a network deployment in which an LTE eNodeB (eNB) is connected to a 5G core network (5GC). This eNB may be referred to as a Next generation (ng)-eNB. The ng-eNB may also be referred to as an eNB/5GC, which means an eNB connected to a 5GC.

First Embodiment

Figure 1:
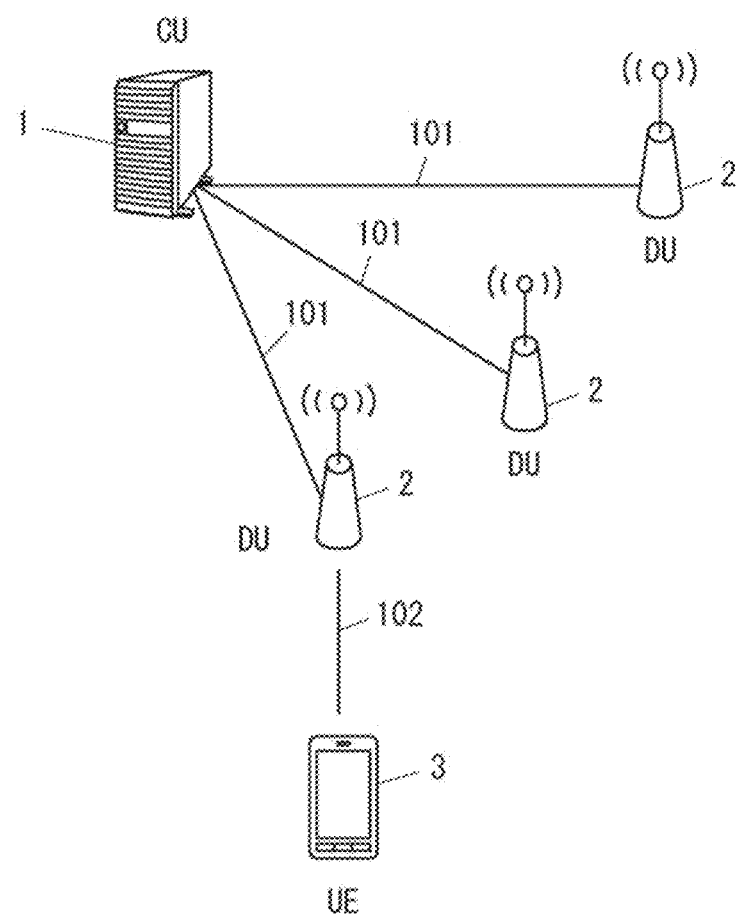
FIG. 1 is a diagram showing a configuration example of a radio communication network according to a first embodiment.

FIG. 1 shows a configuration example of a radio communication network according to the present embodiment. The radio communication network according to the embodiment includes a central unit (CU) 1 and one or more distributed units (DUs) 2. The CU 1 and the one or more DUs 2 are located in a Radio Access Network (RAN). The CU 1 and the one or more DUs 2 operate as a base station (e.g., LTE eNB or gNB). The CU 1 and each DU 2 are connected to each other through an interface 101. A UE 3 is connected to at least one DU 2 through an air interface 102.

The CU 1 and the one or more DUs 2 may be an Evolved Universal Mobile Telecommunications System (UMTS) Terrestrial Radio Access Network (EUTRAN) node or a Next generation Radio Access Network (NG-RAN) node. The EUTRAN node may be an eNB or an en-gNB. The NG-RAN node may be a gNB or a ng-eNB.

The CU 1 may be a logical node that hosts Radio Resource Control (RRC), Service Data Adaptation Protocol (SDAP), and Packet Data Convergence Protocol (PDCP) protocols of the gNB (or hosts the RRC and PDCP protocols of the gNB). The DU 2 may be a logical node that hosts Radio Link Control (RLC), Medium Access Control (MAC), and Physical (PHY) Layers of the gNB. The interface may be a F1 interface if the CU 1 is a gNB-CU and the DUs 2 are gNB-DUs.

Figure 2:
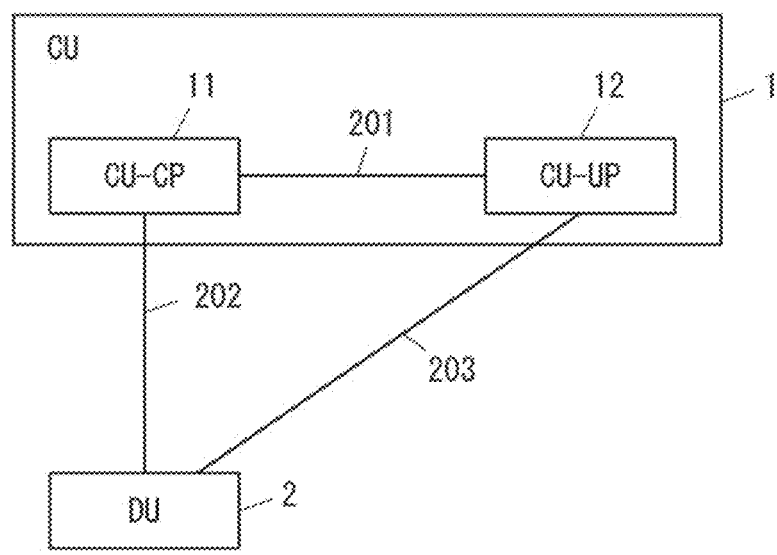
FIG. 2 is a diagram showing a configuration example of a radio communication network according to the first embodiment.

As shown in FIG. 2, the CU 1 may include a Control Plane (CP) Unit (e.g., gNB-CU-CP) 11 and one or more User Plane (UP) Units (e.g., gNB-CU-UPs) 12. In this case, the CU-CP 11 is connected to the CU-UP 12 through a control plane interface 201 (e.g., E1 interface). The CU-CP 11 is also connected to each DU 2 through a control plane interface 202 (e.g., F1-C interface). The CU-UP 12 is connected to each DU 2 through a user plane interface 203 (e.g., F1-U interface).

Figure 3:
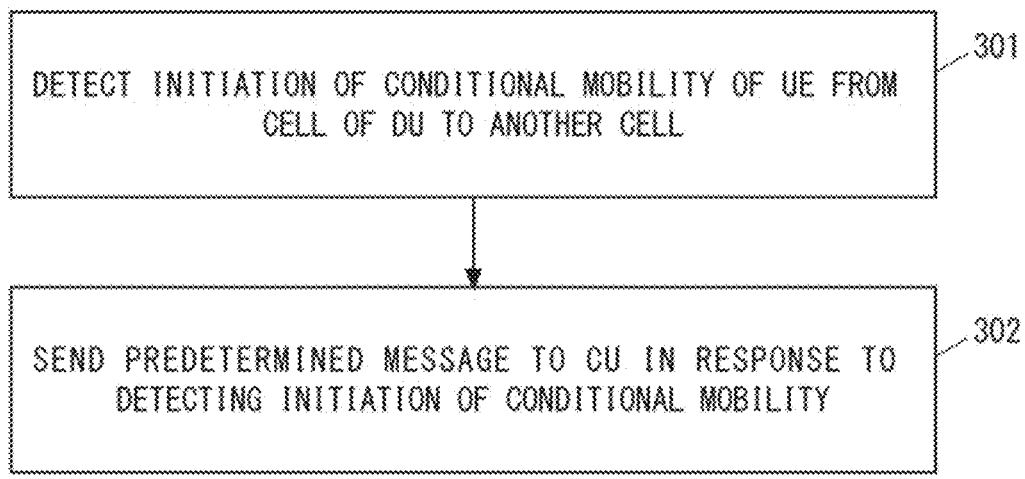
FIG. 3 is a flowchart showing an example of processing performed by a distributed unit according to the first embodiment.

FIG. 3 shows an example of processing performed by a DU 2 of the present embodiment. In step 301, the DU 2 detects initiation of a conditional mobility of the UE 3 from a cell (or a first cell) served by the DU 2 to another cell (or a second cell). Here, the conditional mobility may be a conditional handover. The conditional handover may be an intra-CU intra-DU handover, an intra-Cu inter-DU handover, or an inter-CU handover. In the case of the intra-CU intra-DU handover, the second cell (i.e., target cell) may be served by the same DU 2 as the first cell (i.e., source cell). In the case of the intra-CU inter-DU handover, the second cell (i.e., target cell) may be served by another DU 2 which is different from the DU 2 serving the first cell (i.e., source cell), but is connected to the same CU 1. In the case of the inter-CU handover, the second cell (i.e., target cell) may be served by another RAN node (e.g., another DU connected to a CU 1 different from that the DU 2 serving the first cell (i.e., source cell) is connected to).

Operation similar to those in the conditional handover can be applied to other various mobility scenarios. As described above, in the conditional handover (CHO), the UE 3 initiates access (e.g., random access) to a target cell not in response to receiving a handover command (or an instruction), but in response to satisfaction of a configured condition. The CHO execution condition includes, for example, a threshold and a corresponding time-to-trigger (TTT). Alternatively, the CHO execution condition may be a reception of an explicit execution instruction (e.g., predetermined signaling) from a network. In this case, the reception by the UE 3 of a configuration (e.g., radio parameter) to be used for receiving the execution instruction may implicitly indicate to the UE 3 that the CHO execution condition is the reception of the execution instruction. In other words, if the UE 3 receives this configuration (e.g., radio parameter), the UE 3 may determine (or understand) that the CHO execution condition associated therewith is a reception of the execution instruction (e.g., predetermined signaling).

Similarly, in various types of conditional mobility, the UE 3 initiates access to another cell (a second cell, a target cell) not in response to a reception of a mobility command (e.g., RRC Reconfiguration for mobility), but in response to satisfaction of a condition (e.g., threshold and TTT) configured by the mobility command. Similarly to the conditional handover (CHO), in other types of conditional mobility (e.g., PSCell change), a reception of an explicit execution instruction (e.g., predetermined signaling) from a network may be used as the execution condition of conditional mobility. Furthermore, the above described description on CHO may be applied to other types of conditional mobility.

Such conditional mobility may be, for example, a change of a primary cell of a Master Cell Group (MCG) in Dual Connectivity (DC), or an inter-Master Node (MN) handover in DC. Additionally or alternatively, the conditional mobility may be a Secondary Node (SN) change in DC, or a change of a primary cell of a Secondary Cell Group (SCG) in DC (i.e., Primary SCG Cell (PSCell) change). The PSCell is a Special Cell (SpCell) of the SCG. The UE 3 performs random access to the PSCell when it performs a handover procedure (or a Reconfiguration with Sync procedure). That is, the conditional mobility includes various inter-MN mobility scenarios, intra-MN mobility scenarios, inter-SN mobility scenarios, and intra-SN mobility scenarios.

The DC may be Multi-Radio Dual Connectivity (MR-DC). The MR-DC includes Evolved Universal Mobile Telecommunications System (UMTS) Terrestrial Radio Access (E-UTRA)-NR Dual Connectivity (EN-DC), NR-E-UTRA DC (NE-DC), NG-RAN EN-DC (NGEN-DC), and NR-NR DC (NR DC).

The conditional PCell change and the conditional inter-MN handover may involve an MN initiated SN change.

The conditional PSCell change may be inter-gNB-DU mobility using MCG SRB. In other words, RRC signaling between the UE and the CU (i.e., Secondary Node (SN)) for the inter-DU PSCell change may be performed via a signaling radio bearer (SRB) (e.g., SRB1) of the Master Cell Group (MCG) served by the Master Node (MN).

The conditional PSCell change may be inter-gNB-DU mobility using SCG SRB. In other words, RRC signaling between the UE and the CU (i.e., secondary node (SN)) for the inter-DU PSCell change may be performed via an SRB (e.g., SRB3) of the Secondary Cell Group (SCG).

The conditional PSCell change may be an MN initiated SN change or an SN initiated SN change. In other words, RRC signaling between the UE and the target SN (e.g., target CU) for the PSCell change between SNs (e.g., between CUs of different SNs) may be performed via an SRB (e.g., SRB1) of the MCG.

The conditional intra-CU PSCell change may also be referred to as a conditional SN modification. The intra-CU PSCell change is an example of configuration change of SCG within the same SN. Such a configuration change of SCG within the same SN uses an SN initiated SN Modification with (or without) MN involvement procedure.

The PSCell Change procedure is one example of a procedure involving a Reconfiguration with sync procedure. For this reason, the conditional PSCell change may also be referred to as a conditional Reconfiguration with sync (for PSCell change).

In some implementations, the DU 2 may detect initiation (or execution) of a conditional mobility by receiving an indication (e.g., measurement report) of the conditional mobility from UE 3. Alternatively, the DU 2 may autonomously determine satisfaction of a condition of initiation (or execution) of a conditional mobility, thereby autonomously detecting the initiation (or execution) of the conditional mobility.

In step 302, in response to detecting the initiation of the conditional mobility, the DU 2 sends a predetermined message to the CU 1 with which the DU 2 is associated. Accordingly, the predetermined message is associated with the initiation (or execution) of the conditional mobility of the UE 3. By way of example, and not limitation, the predetermined message may explicitly indicate the initiation of the conditional mobility.

Figure 4:
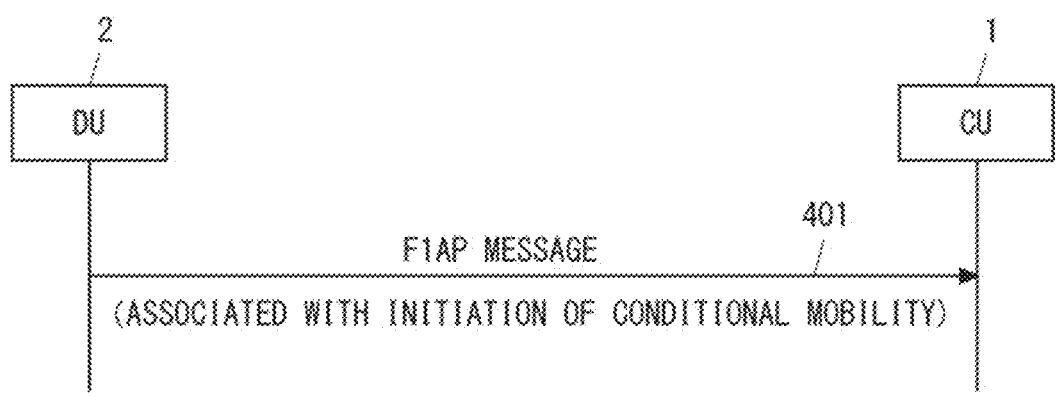
FIG. 4 is a sequence diagram showing an example of signaling according to the first embodiment.

FIG. 4 shows an example of signaling according to the present embodiment. In step 401, the DU 2 sends to the CU 1 a predetermined message (e.g., F1AP message) associated with initiation of a conditional mobility.

As can be understood from the above description, in the present embodiment, the DU 2 sends a predetermined message to the CU 1 with which the DU 2 is associated, in response to detecting initiation of a conditional mobility. This allows the CU 1 to be aware of the initiation of the conditional mobility.

In some conditional mobility scenarios (e.g., intra-CU inter-DU handover, and intra-CU inter-DU PSCell change), it may be preferable that the CU 1 is able to continue data transmission (downlink, uplink, or both) for the UE 3 via the source DU 2 until just before the initiation (or execution) of the conditional mobility. According to the operation described in the present embodiment, it is possible to allow the CU 1 to be aware of initiation (or execution) of the conditional mobility by receiving a predetermined message from the source DU 2. Accordingly, for example, the CU 1 may operate to continue data transmission (downlink, uplink, or both) for the UE 3 via the source DU 2 until receiving the predetermined message.

In some implementations, the above described predetermined message may be common to an existing message or data to be sent from the DU2 to the CU 1. For example, the predetermined message may be a massage (e.g., F1AP massage) to be sent in a signaling procedure for changing a UE context regarding the UE 3. More specifically, the predetermined message may be a UE CONTEXT MODIFICATION RESPONSE message which is transmitted in a UE Context Modification procedure.

The predetermined message may be a message (or a frame, or a Protocol Data Unit (PDU)) to be sent to the CU 1 for indicating downlink data which has not been transmitted to the UE 3. More specifically, the predetermined message may be a DOWNLINK DATA DELIVERY STATUS (DDDS) frame.

Alternatively, in some implementations, the above described predetermined message may be a message or data (e.g., F1AP message) which is newly defined to indicate initiation of a conditional mobility. For example, the source DU 2 may send a UE CONTEXT MODIFICATION RESPONSE message to the CU 1, further send a DDDS frame to the CU1, and thereafter send a message or data which is newly defined to indicate initiation of a conditional mobility to the CU1. The source DU 2 may send a DDSS frame again to the CU 1 when it transmits the new message or data to the CU 1.

Second Embodiment

The present embodiment provides an improved operation of a DU to adapt conditional mobility. The configuration example of a radio communication network according to the present embodiment may be similar to the example shown in FIGS. 1 and 2.

Figure 5:
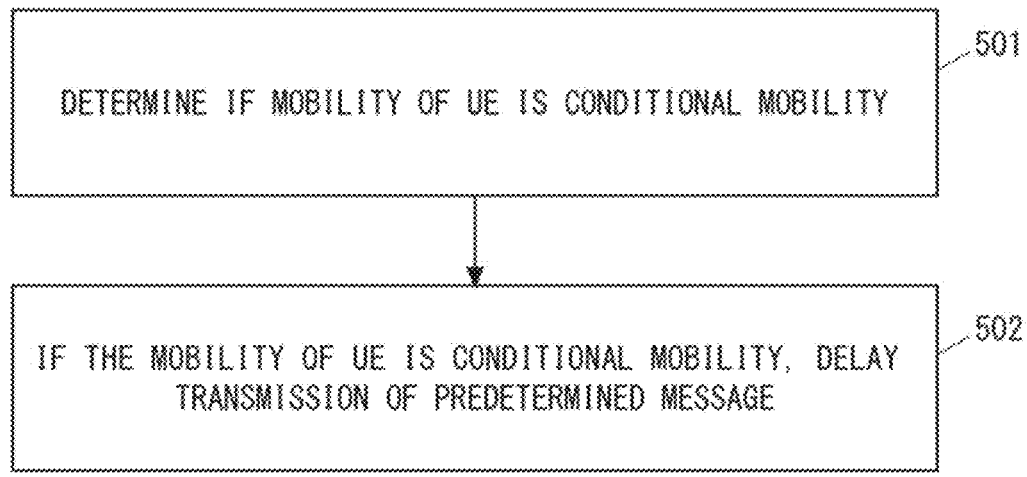
FIG. 5 is a flowchart showing an example of processing performed by a distributed unit according to a second embodiment.

FIG. 5 shows an example of processing performed by a DU 2 of the present embodiment. In step 501, the DU 2 determines if a planned mobility of a UE 3 is a conditional mobility. The DU 2 may determine if the planned mobility of the UE 3 is a conditional mobility based on whether or not a control message received from the CU 1 includes an information element associated with the conditional mobility. Alternatively, the DU 2 may determine if the planned mobility of the UE 3 is a conditional mobility based on whether or not an information element contained in a control message received from the CU 1 indicates the conditional mobility (or that the conditional mobility is planned for the UE 3).

The control message (or an information element contained therein) may indicate explicitly or implicitly that the planned mobility of the UE 3 is the conditional mobility. The information element may be, for example, an information element that indicates a condition of initiation (or execution) of the conditional mobility. The information element may be any indication (e.g., a conditional mobility information element (IE) or a conditional mobility flag (bit)) that indicates the conditional mobility.

In some implementations, the control message may be a message (e.g., F1AP message) to be transmitted in a signaling procedure for changing a UE context regarding the UE 3. More specifically, the control message may be a UE CONTEXT MODIFICATION REQUEST massage which is transmitted in a UE Context Modification procedure.

In step 502, if the planned mobility is the conditional mobility, the DU 2 delays transmission of a predetermined message to the CU 1 as compared to a case where the planned mobility is not the conditional mobility (e.g., a case of a normal mobility (e.g., handover)).

In some implementations, the predetermined message may be a message (e.g., F1AP message) to be transmitted in a signaling procedure for changing a UE context regarding the UE 3. More specifically, the predetermined message may be a UE CONTEXT MODIFICATION RESPONSE message which is transmitted in a UE Context Modification procedure. In normal (i.e., non-conditional) UE mobility, the DU 2 executes a requested modification in response to receiving a UE CONTEXT MODIFICATION REQUEST message from the CU 1, and reports updates via the UE CONTEXT MODIFICATION RESPONSE message. In contrast to this, in conditional UE mobility, the DU 2 may put on hold a requested modification after receiving a UE CONTEXT MODIFICATION REQUEST message from the CU 1. Thereafter, the DU 2 may execute the requested modification in response to satisfaction of an initiation condition of the conditional mobility, and report updates via the UE CONTEXT MODIFICATION RESPONSE message.

Alternatively, in some implementations, the predetermined message may be a message (or a frame, or a Protocol Data Unit (PDU)) to be transmitted to the CU 1 for indicating downlink data not yet transmitted to the UE 3. More specifically, the predetermined message may be a DOWNLINK DATA DELIVERY STATUS (DDDS) frame. The DDDS frame may be a GTP-U (or F1-U) PDU. In normal (i.e., non-conditional) UE mobility, the DU 2 sends a DDDS frame to the CU 1 in response to receiving a UE CONTEXT MODIFICATION REQUEST message (including a Transmission Stop Indicator information element indicating stop of the data transmission for the UE 3) from the CU 1. In contrast to this, in conditional UE mobility, the DU 2 may continue data transmission for the UE 3 even after receiving the UE CONTEXT MODIFICATION REQUEST message from the CU 1. Thereafter, the DU 2 may stop the data transmission for the UE 3 in response to satisfaction of an initiation condition of the conditional mobility, and send a DDDS frame to the CU 1.

The DDDS frame may contain new information (e.g., a bit) indicating initiation (or execution) of a conditional mobility. Instead, the DU 2 may reuse the same DDDS frame as used in normal (i.e., non-conditional) UE mobility, while it may further send from the DU 2 to the CU 1 a message newly defined for indicating initiation (or execution) of a conditional mobility. This message may be referred to as a CONDITIONAL MOBILITY (or HANDOVER, PSCell CHANGE, or RECONFIGURATION WITH SYNC) TRIGGERED (or INITIATED, DETECTED, INDICATION, or INSTRUCTION) message. In this case, the DU 2 may send the DDDS frame after this message or before the message.

In the present embodiment, if a planned mobility of the UE 3 is a conditional mobility, the DU 2 delays transmission of a predetermined message to the CU 1 as compared to the case where the planned mobility is not a conditional mobility. Specifically, for example, the DU 2 may put on hold (or postpone) the transmission of the predetermined message to the CU 1 until satisfaction of an initiation condition of the conditional mobility (or until detecting satisfaction of the initiation condition). Thus, the predetermined message can be also used to report the initiation (or execution) of the conditional mobility to the CU 1. In other words, the CU 1 can know that the UE 3 has initiated (or executed) the conditional mobility, by receiving the predetermined message.

Third Embodiment

The present embodiment provides specific examples of signaling for conditional mobility. A configuration example of a radio communication network according to the present embodiment may be similar to the example shown in FIGS. 1 and 2.

Figure 6:
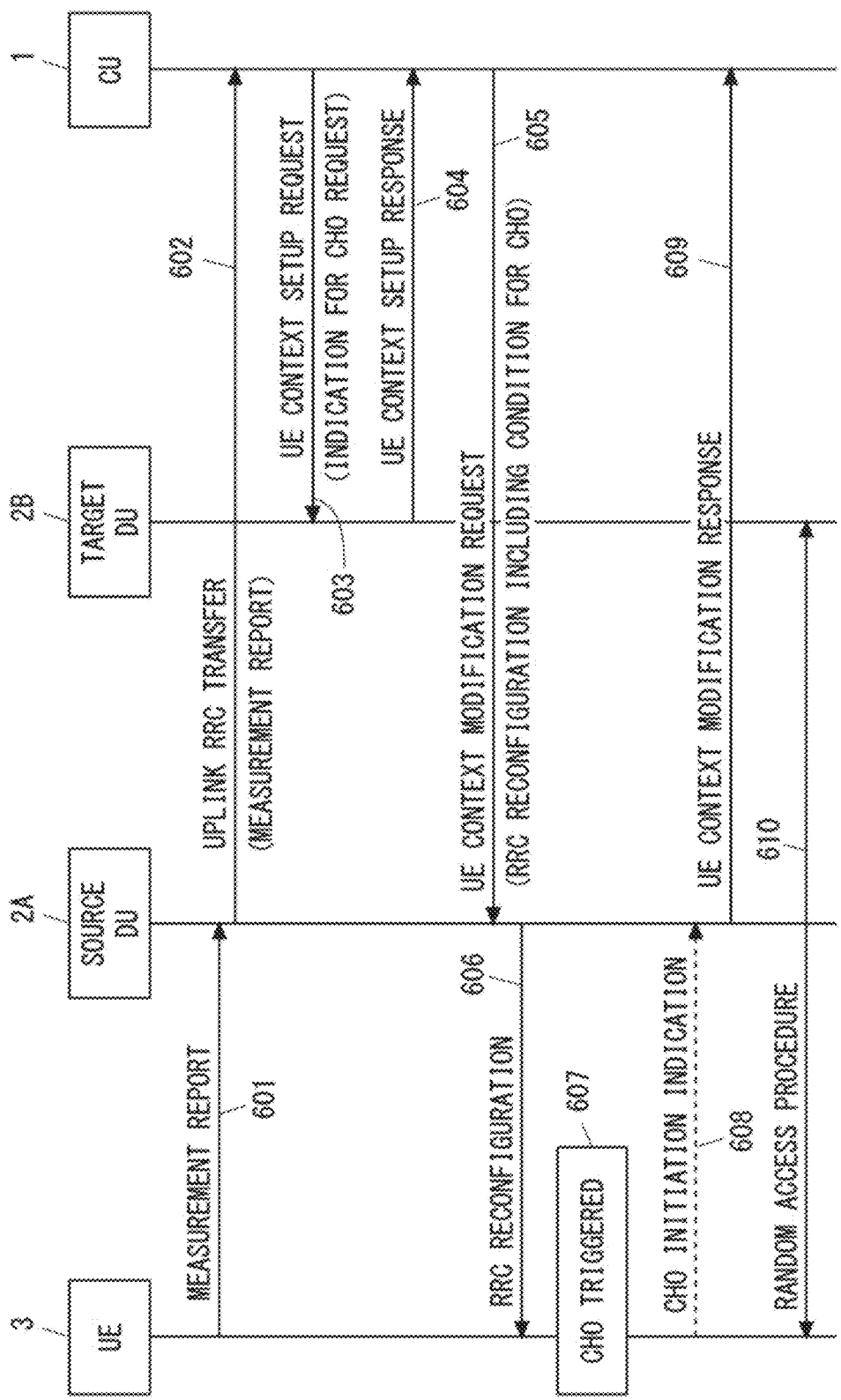
FIG. 6 is a sequence diagram showing an example of signaling according to a third embodiment.

FIG. 6 shows an example of an intra-CU inter-DU conditional handover (CHO) procedure. The procedure of FIG. 6 may be used for a conditional PSCell change using an SRB (e.g., SRB 3) of an SCG. In other words, the procedure of FIG. 6 may be used for inter-gNB-DU mobility using SCG SRB.

Before the procedure of FIG. 6, a CU 1 may generate an RRC message (e.g., RRCReconfiguration message) that includes a measurement configuration (e.g., MeasConfig) containing a reporting configuration (e.g., ReportConfig) for CHO, and transmit it to a UE 3 via a source DU 2A. The measurement configuration for CHO enables early event triggering (i.e., lowering of a threshold for triggering a measurement report by the UE 3) for CHO determination. Though the DU 2A receives the RRC message including the measurement configuration, the DU 2A does not need to recognize that the measurement configuration is included in this RRC message. In other words, the DU 2A may transparently forward to the UE 3 the measurement configuration received from the CU 1. The same applies to the below description including other embodiments. The DU 2A may similarly handle an RRC message which includes information other than the measurement configuration and is transmitted from the CU1 to the UE 3.

In step 601, the UE 3 sends a measurement report to the source DU 2A. In step 602, the source DU 2A sends an UPLINK RRC TRANSFER message to the CU 1 to forward the received measurement report. Based on the measurement report, the CU 1 decides a CHO of the UE 3 from a cell of the source DU 2A to a cell of a target DU 2B. Though the DU 2A receives the RRC message including the measurement report, the DU 2A does not need to recognize that the measurement report is included in this RRC message. In other words, the DU 2A may transparently forward to the CU 1 the measurement report received from the UE 3. The same applies to the below description including other embodiments. The DU 2A may similarly handle an RRC message which includes information other than the measurement report and is transmitted from the UE 3 to the CU1.

In step 603, the CU 1 sends a UE CONTEXT SETUP REQUEST message to the DU 2B to create a UE context and set up one or more bearers. The UE CONTEXT SETUP REQUEST message may request the target DU 2B to provide a configuration of radio resources (e.g., CellGroupConfig) of the target cell for CHO. To indicate that it is a CHO request, a "Handover Preparation Information" information element contained in a "CU to DU RRC Information" information element within the UE CONTEXT SETUP REQUEST message may be used. Alternatively, to indicate that it is a CHO request, a new information element may be defined within the UE CONTEXT SETUP REQUEST message.

In step 604, the target DU 2B responses to the CU 1 with a UE CONTEXT SETUP RESPONSE message. In response to receiving the CHO request, the target DU 2B may determine if the CHO is acceptable. The target DU 2B may include in the UE CONTEXT SETUP RESPONSE message an information element indicating whether the CHO is acceptable (step 604).

In step 605, the CU 1 sends to the source DU 2A a UE CONTEXT MODIFICATION REQUEST message including an RRC-Container which contains an RRC message (e.g., RRCReconfiguration message) generated by the CU 1. The RRC message includes an initiation (or execution) condition (e.g., threshold and TTT) of the CHO. The RRC message may further include a condition (e.g., offset) for the UE 3 to exit the CHO and a value of a validity timer. The value of the validity timer may indicate how long the resources of the candidate target cell are valid. Alternatively, the value of the validity timer may indicate a period (or time) during which access to the candidate target cell is permitted, or a period (or time) during which the configuration for the CHO is valid.

The UE CONTEXT MODIFICATION REQUEST message (step 605) may include an information element (IE) which explicitly or implicitly indicates that it includes a CHO instruction to the UE 3 (i.e., RRC configuration information needed for a CHO-type handover), or indicates that it is intended for a CHO. The DU 2A may determine if the received UE CONTEXT MODIFICATION REQUEST message includes this IE. For example, the DU 2A may decide doing the following steps if it determines that a CHO is needed.

More specifically, the CU 1 may determine a CHO initiation condition and include it in a CU To DU RRC Information information element (e.g., Handover Preparation Information included therein) or new information element contained in the UE CONTEXT SETUP REQUEST message (step 603). Thereafter, the target DU 2B may generate a radio resource configuration (e.g., CellGroupConfig) of the target cell containing the CHO initiation condition, and include it in the UE CONTEXT SETUP RESPONSE message (step 604). Moreover, the CU 1 may generate an RRCReconfiguration message containing the received radio resource configuration (e.g., CellGroupConfig) and include it in the RRC-Container within the UE CONTEXT MODIFICATION REQUEST message (step 605).

Alternatively, the CU 1 may determine a CHO initiation condition and include it in a new information element in the UE CONTEXT MODIFICATION REQUEST message (step 605).

Further alternatively, the target DU 2B may determine a CHO initiation condition. In this case, the target DU 2B may determine a CHO initiation condition in response to the CHO request (step 603), and include the decided CHO initiation condition in a CellGroupConfig information element or new information element in the UE CONTEXT SETUP RESPONSE message (step 604). Thereafter, the CU 1 may generate an RRCReconfiguration message containing the CellGroupConfig information element or new information element, which includes the CHO initiation condition, and then include it in the UE CONTEXT MODIFICATION REQUEST message (step 605). The CU 1 may include an information element (IE) or parameter which explicitly indicates a CHO instruction, in the RRCReconfiguration message.

In addition to the CHO initiation condition, the condition (e.g., offset) for the UE 3 to exit the CHO and the value of the validity timer may be handled in the same manner as the CHO initiation condition. Alternatively, each of the CHO initiation condition, the condition of exiting the CHO, and the value of the validity timer may be handled by any of the methods described above.

In step 606, the source DU 2A forwards the received RRCReconfiguration message to the UE 3.

Upon receiving the RRCReconfiguration message (step 606), the UE 3 determines if the message is a CHO instruction, according to whether or not the message includes an information element (IE) or parameter indicating a CHO instruction, or whether or not the message includes a CHO initiation condition. When determining that the message is a CHO instruction, the UE 3 maintains the connection with the source DU 2A even after receiving the RRCReconfiguration message. In response to satisfaction of a CHO execution condition (step 607) which is configured by the RRCReconfiguration message, the UE 3 initiates access (i.e., random access procedure) to the target DU 2B (step 610). The UE 3 may transmit an indication (or report) of CHO initiation to the source DU 2A (step 608).

The indication of CHO initiation from the UE 3 may be Uplink Control Information (UCI) transmitted through a Physical Uplink Control Channel (PUCCH). Instead, the indication of CHO initiation may be a MAC Control Element (CE). The source DU 2A may determine in advance and notify the UE 3 via the CU 1 of a configuration of a radio resource to be used for the indication of CHO initiation. For example, the source DU 2A may include the configuration of the radio resource to be used for the indication of CHO initiation in information (e.g., CellGroupConfig) contained in the UE CONTEXT SETUP RESPONSE message, and send it to the CU 1. Thereafter, the CU 1 may generate an RRCReconfiguration message including the configuration of the radio resource to be used for the indication of CHO initiation, and transmit it to the UE 3. If there are a plurality of candidate target cells, the indication of CHO initiation may include information which explicitly or implicitly indicates the selected candidate target cell (i.e., the candidate target cell for which the handover has been triggered).

In step 609, the source DU 2A responds to the CU 1 with a UE CONTEXT MODIFICATION RESPONSE message. In an example, the source DU 2A may send the UE CONTEXT MODIFICATION RESPONSE message (step 609) in response to receiving the indication of CHO initiation (step 608) from the UE 3. In this case, the UE CONTEXT MODIFICATION RESPONSE message can be also used to report the initiation (or execution) of the CHO to the CU 1. In another example, the source DU 2A may send the UE CONTEXT MODIFICATION RESPONSE message (step 609) regardless of receiving the indication of CHO initiation (step 608). The source DU 2A may send the UE CONTEXT MODIFICATION RESPONSE message (step 609) prior to receiving the indication of CHO initiation (step 608).

Although not shown in FIG. 6, the UE 3 may respond to the CU 1 via the target DU 2B with an RRCReconfigurationComplete message after succeeding in the random access procedure (step 610). The target DU 2B may send an UPLINK RRC TRANSFER message to the CU 1 to forward the RRCReconfiguration Complete message received from the UE 3. Thereafter, the CU 1 may send a UE CONTEXT RELEASE COMMAND message to the source DU 2A. In this case, a release Cause value attached to (or included in) the UE CONTEXT RELEASE COMMAND message may be, for example, "Handover Condition Met", "Action Desirable for Radio Reasons", "Handover Complete", or "Normal Release". The source DU 2A may release the UE context regarding the UE 3 and respond to the CU 1 with a UE CONTEXT RELEASE COMPLETE message.

Figure 7:
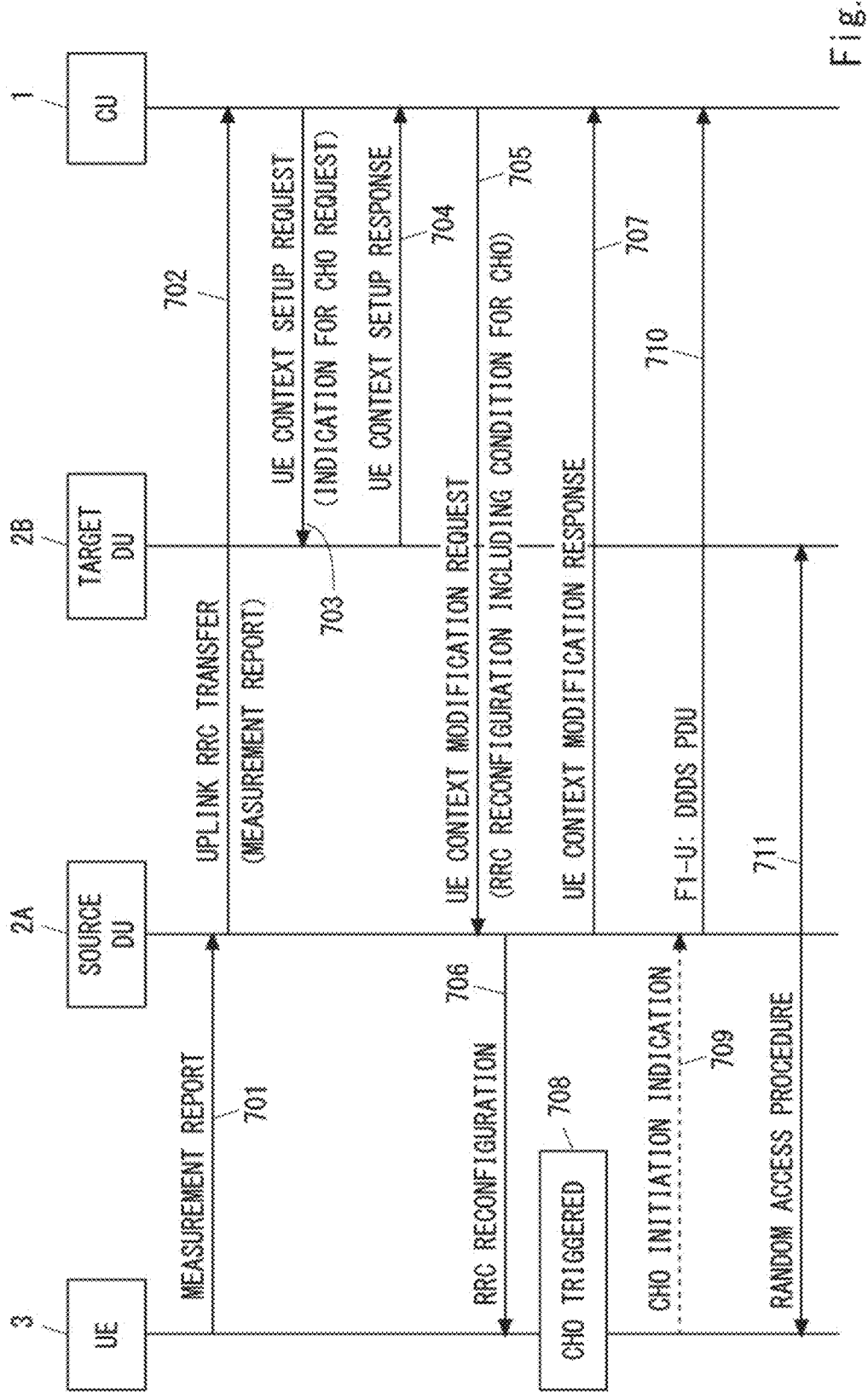
FIG. 7 is a sequence diagram showing an example of signaling according to the third embodiment.

FIG. 7 shows another example of an intra-CU inter-DU conditional handover (CHO) procedure. The procedure of FIG. 7 may be used for a conditional PSCell change using an SRB (e.g., SRB3) of an SCG. The processing of steps 701 to 706 is similar to that of steps 601 to 606 of FIG. 6. In step 707, the source DU 2A responds to the CU 1 with a UE CONTEXT MODIFICATION RESPONSE message.

In step 708, the UE 3 determines satisfaction of a CHO execution condition configured by the RRCReconfiguration message and initiates access (i.e., random access procedure) to the target DU 2B (step 711). The UE 3 may transmit an indication (or report) of CHO initiation to the source DU 2A (step 709). The indication of CHO initiation from the UE 3 may be uplink control information (UCI) transmitted via a PUCCH. Instead, the indication of CHO initiation may be a MAC CE.

In step 710, the source DU 2A sends a DDDS frame to the CU 1. In one example, the source DU 2A may send the DDDS frame (step 710) in response to receiving the indication of CHO initiation (step 709) from the UE 3. In this case, the DDDS frame can be also used to report the CHO initiation (or execution) to the CU 1. Instead, although not illustrated, the source DU 2A may send a new message to the CU 1 to indicate the CHO initiation (or execution), in addition to a DDDS frame as used in a normal (i.e., non-conditional) handover. This message may be referred to as a CONDITIONAL HANDOVER TRIGGERED (or INITIATED, DETECTED, INDICATION, or INSTRUCTION) message. In another example, the source DU 2A may send the DDDS frame (step 710) regardless of receiving the indication of CHO initiation (step 709). The source DU 2A may send the DDDS frame (step 710) prior to receiving the indication of the CHO initiation (step 709).

Although not shown in FIG. 7, UE 3 may respond to the CU 1 via the target DU 2B with an RRCReconfigurationComplete message after succeeding in the random access procedure (step 711). The target DU 2B may send an UPLINK RRC TRANSFER message to the CU 1 to forward the RRCReconfiguration Complete message received from the UE 3. Thereafter, the CU 1 may send a UE CONTEXT RELEASE COMMAND message to the source DU 2A. In this case, a release Cause value attached to (or included in) the UE CONTEXT RELEASE COMMAND message may be, for example, "Handover Condition Met", "Action Desirable for Radio Reasons", "Handover Complete", or "Normal Release". The source DU 2A may release the UE context regarding the UE 3 and respond to the CU 1 with a UE CONTEXT RELEASE COMPLETE message.

The procedures described in the present embodiment enable an intra-CU inter-DU conditional handover.

Fourth Embodiment

The present embodiment provides specific examples of signaling for conditional mobility. The configuration example of a radio communication network according to the present embodiment may be similar to the example shown in FIGS. 1 and 2.

Figure 8:
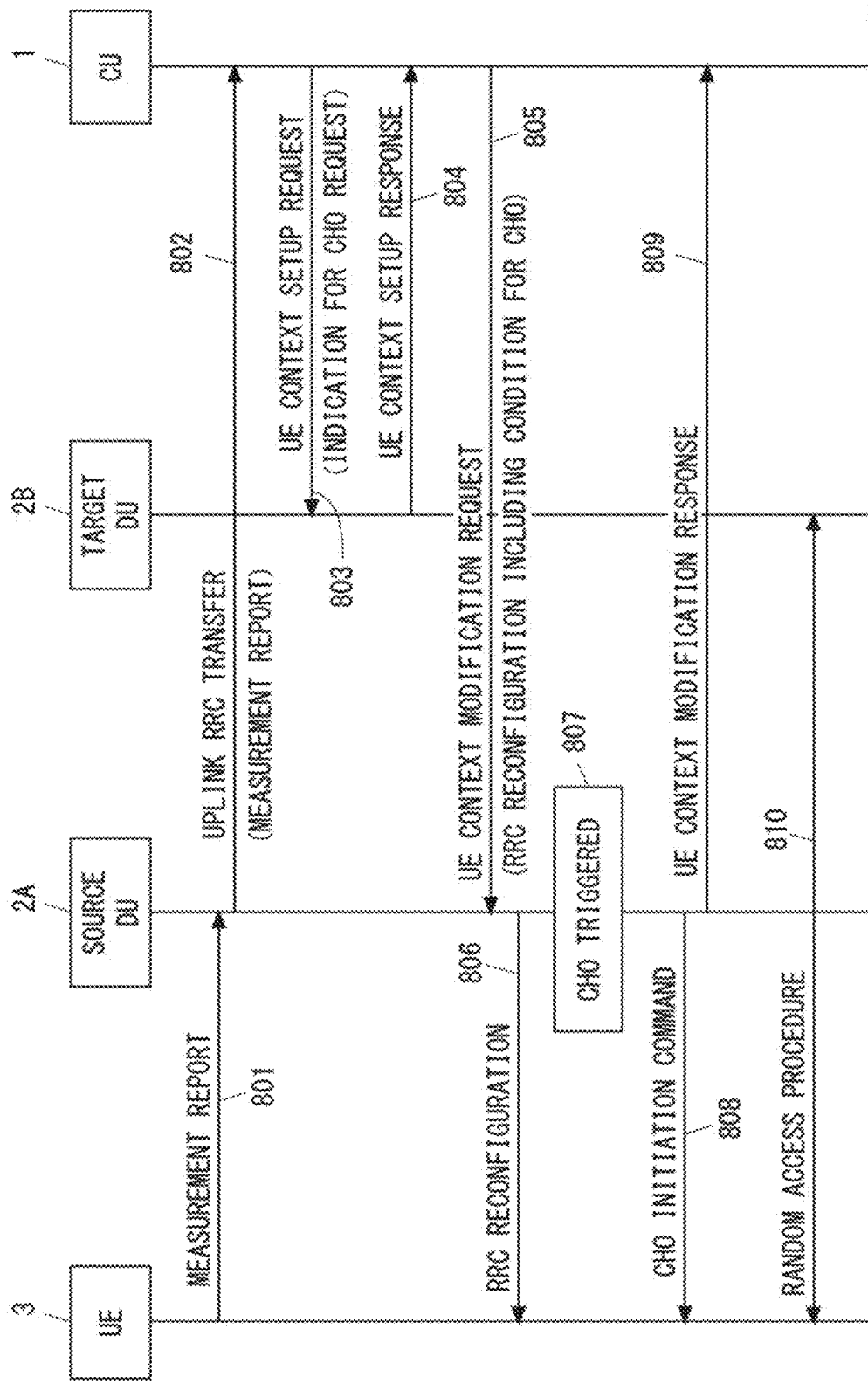
FIG. 8 is a sequence diagram showing an example of signaling according to a fourth embodiment.

FIG. 8 shows an example of an intra-CU inter-DU conditional handover (CHO) procedure. The procedure in FIG. 8 may be used for a conditional PSCell change using an SRB (e.g., SRB3) of an SCG. The processing of steps 801 to 806 is similar to that of steps 601 to 606 of FIG. 6.

In step 807, a source DU 2A autonomously determines satisfaction of a CHO execution condition. In step 808, the source DU 2A sends a CHO initiation command to a UE 3 in response to the satisfaction of the CHO execution condition. The CHO initiation command may be Downlink Control Information (DCI) transmitted on via a Physical Downlink Control Channel (PDCCH). Instead, the CHO initiation command may be a MAC Control Element (CE). The source DU 2A may determine in advance and notify of the UE 3 via a CU 1 of a configuration of a radio resource to be used for the CHO initiation command. For example, the source DU 2A may include the configuration of the radio resource to be used for the CHO initiation command in information (e.g., CellGroupConfig) contained in a UE CONTEXT SETUP RESPONSE message, and send it to the CU 1. Thereafter, the CU 1 may generate an RRCReconfiguration message including the configuration of the radio resource to be used for the CHO initiation command, and transmit it to the UE 3. If there are a plurality of candidate target cells, the CHO initiation command may include information that explicitly or implicitly indicates the selected candidate target cell (i.e., the candidate target cell for which the handover has been triggered).

In step 809, the source DU 2A responds to the CU 1 with a UE CONTEXT MODIFICATION RESPONSE message. In one example, the source DU 2A may send a UE CONTEXT MODIFICATION RESPONSE message (step 809) in response to the satisfaction of the CHO execution condition. In this case, the UE CONTEXT MODIFICATION RESPONSE message can be also used to report the CHO initiation (or execution) to the CU 1. In another example, the source DU 2A may send the UE CONTEXT MODIFICATION RESPONSE message (step 809) regardless of the satisfaction of the CHO execution condition. The source DU 2A may send the UE CONTEXT MODIFICATION RESPONSE message (step 809) prior to the satisfaction of the CHO execution condition.

In step 810, the UE 3 initiates access (i.e., random access procedure) to a target DU 2B in response to receiving the CHO initiation command.

Although not shown in FIG. 8, the UE 3 may respond to the CU 1 via the target DU 2B with an RRCReconfiguration Complete message after succeeding in the random access procedure (step 810). The target DU 2B may send an UPLINK RRC TRANSFER message to the CU 1 to forward the RRCReconfigurationComplete message received from the UE 3. Thereafter, the CU 1 may send a UE CONTEXT RELEASE COMMAND message to the source DU 2A. The source DU 2A may release the UE context regarding the UE 3 and respond to the CU 1 with a UE CONTEXT RELEASE COMPLETE message.

Figure 9:
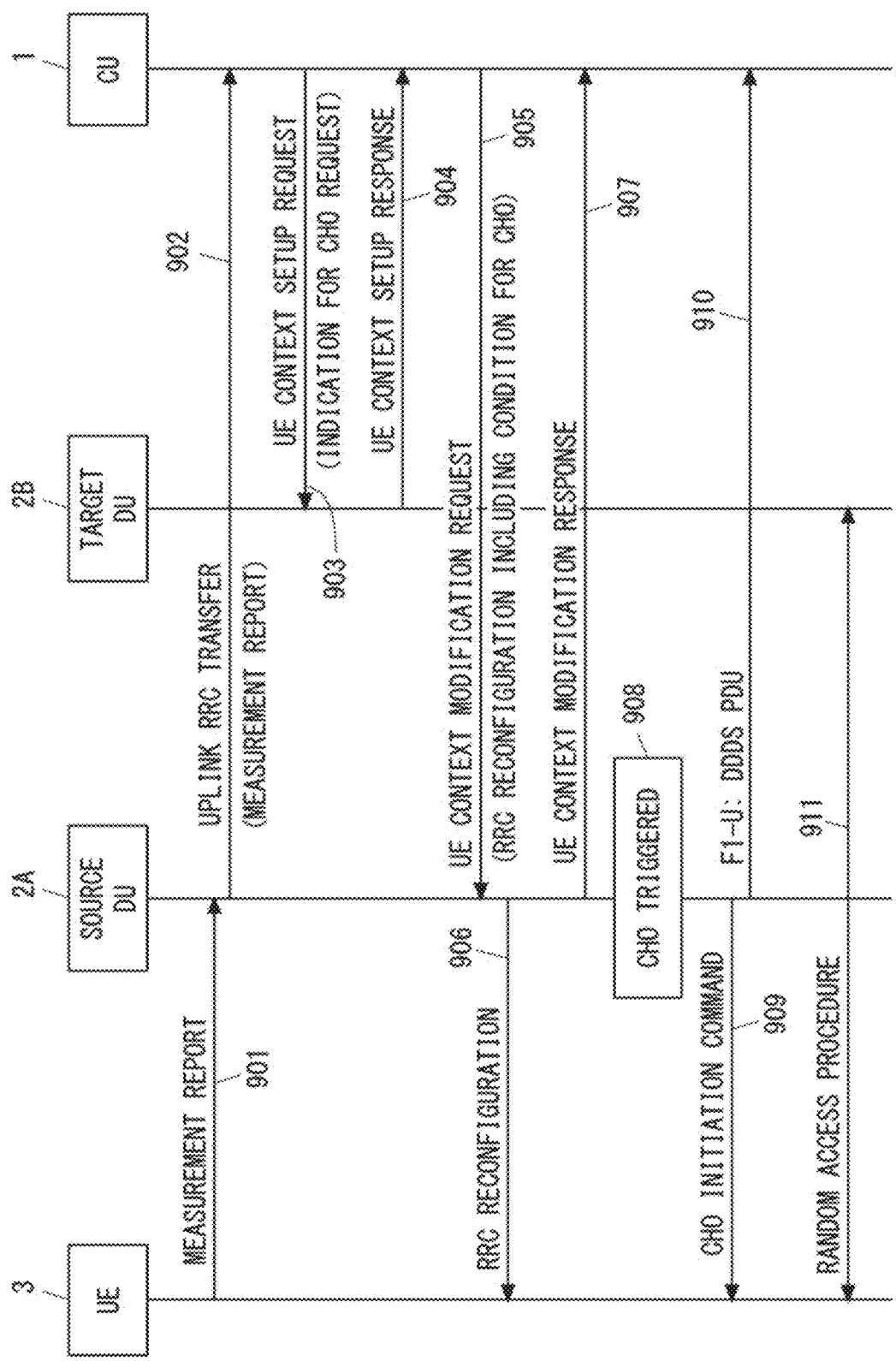
FIG. 9 is a sequence diagram showing an example of signaling according to the fourth embodiment.

FIG. 9 shows another example of an intra-CU inter-DU conditional handover (CHO) procedure. The procedure of FIG. 9 may be used for a conditional PSCell change using an SRB (e.g., SRB3) of an SCG. The processing of steps 901 to 906 is similar to that of steps 801 to 806 of FIG. 8. In step 907, the source DU 2A responds to the CU 1 with a UE CONTEXT MODIFICATION RESPONSE message.

In step 908, the source DU 2A autonomously determines satisfaction of a CHO execution condition. In step 909, the source DU 2A sends a CHO initiation command to the UE 3 in response to the satisfaction of the CHO execution condition. The CHO initiation command may be DCI transmitted via a PDCCH. Instead, the CHO initiation command may be a MAC CE.

In step 910, the source DU 2A sends a DDDS frame to the CU 1. In one example, the source DU 2A may send the DDDS frame (step 910) in response to the satisfaction of the CHO execution condition. In this case, the DDDS frame can be also used to report the CHO initiation (or execution) to the CU 1. Instead, although not illustrated, the source DU 2A may send a new message to the CU 1 to indicate the CHO initiation (or execution), in addition to a DDDS frame as used in a normal (i.e., non-conditional) handover. This message may be referred to as a CONDITIONAL HANDOVER TRIGGERED (or INITIATED, DETECTED, INDICATION, or INSTRUCTION) message. In another example, the source DU 2A may send the DDDS frame (step 910) regardless of the satisfaction of the CHO execution condition. The source DU 2A may send the DDDS frame (step 910) prior to the satisfaction of the CHO execution condition.

Although not shown in FIG. 9, the UE 3 may respond to the CU 1 via the target DU 2B with an RRCReconfiguration Complete message after succeeding in a random access procedure (step 911). The target DU 2B may send an UPLINK RRC TRANSFER message to the CU 1 to forward the RRCReconfiguration Complete message received from the UE 3. Thereafter, the CU 1 may send a UE CONTEXT RELEASE COMMAND message to the source DU 2A. In this case, a release Cause value attached to (or included in) the UE CONTEXT RELEASE COMMAND message may be, for example, "Handover Condition Met", "Action Desirable for Radio Reasons", "Handover Complete", or "Normal Release". The source DU 2A may release the UE context regarding the UE 3 and respond to the CU 1 with a UE CONTEXT RELEASE COMPLETE message.

The procedures described in the present embodiment enable an intra-CU inter-DU conditional handover.

Fifth Embodiment

The present embodiment provides specific examples of signaling for conditional mobility. The configuration example of a radio communication network according to the present embodiment may be similar to the example shown in FIGS. 1 and 2.

Figure 10:
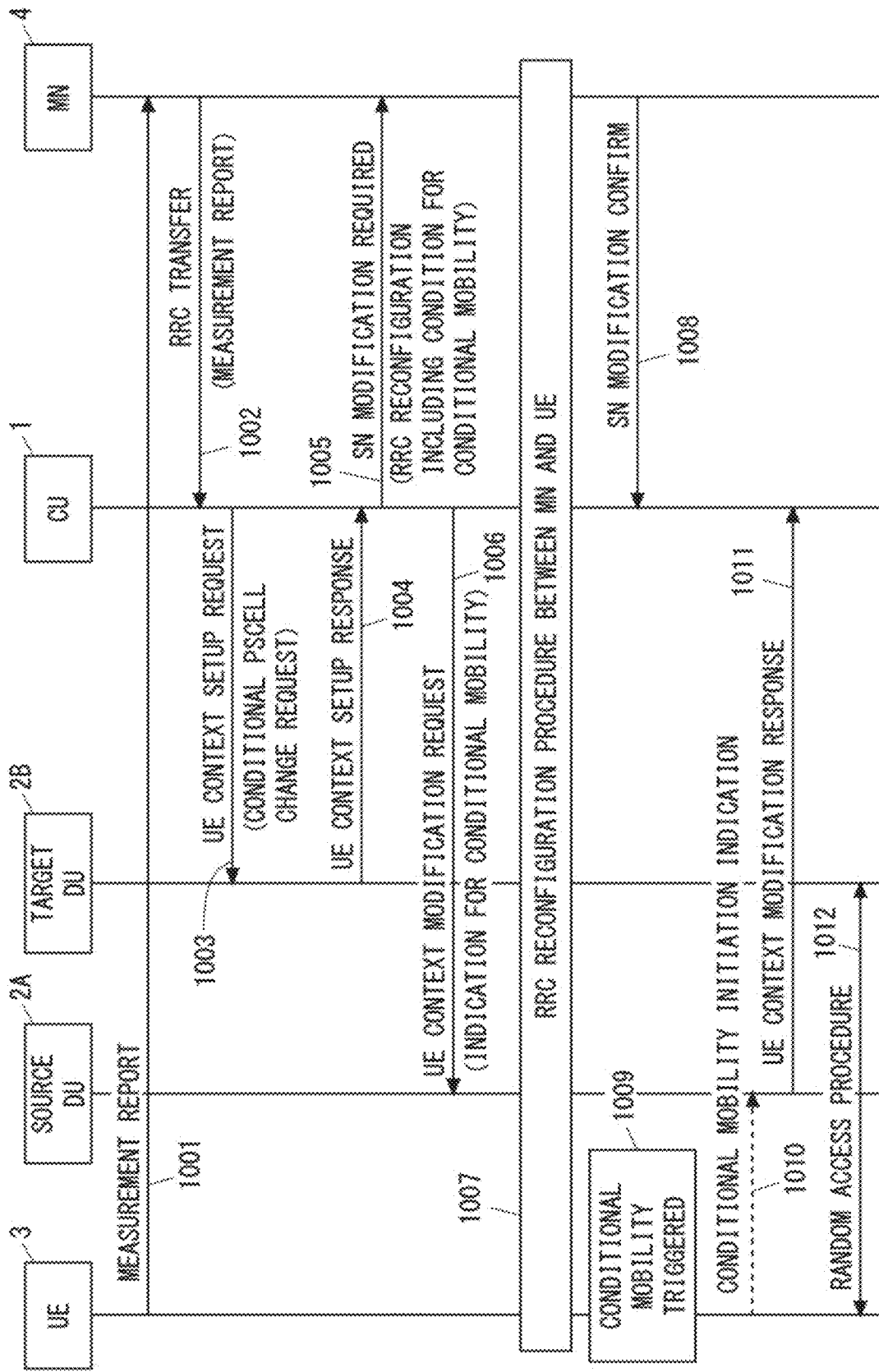
FIG. 10 is a sequence diagram showing an example of signaling according to a fifth embodiment.

FIG. 10 shows an example of an intra-CU inter-DU conditional PSCell Change procedure. As already described, the conditional PSCell change can also be referred to as a conditional Reconfiguration with sync (for PSCell change). FIG. 10 shows a case where an MN 4 (e.g., Master eNB (MeNB)) is involved in the PSCell change in MR-DC. In the example of FIG. 10, the PSCell for the UE 3 is changed from a cell of a source DU 2A to a cell of a target DU 2B. RRC signaling transmitted between an SN (i.e., CU 1) and the UE 3 for the PSCell change uses an SRB in the MCG served by the MN 4.

Prior to the procedure of FIG. 10, the CU 1 may generate an RRC message (e.g., RRCReconfiguration message) including a measurement configuration (e.g., MeasConfig) which contains a reporting configuration (e.g., ReportConfig) for the conditional PSCell change, and transmit it to the UE 3 via an MCG SRB served by the MN 4. The measurement configuration for the conditional PSCell change enables early event triggering (i.e., lowering a threshold for triggering a measurement report by the UE 3) for conditional PSCell change determination.

In steps 1001 and 1002, the UE 3 sends a measurement report to the CU 1 via the MN 4. In step 1002, the MN 4 sends an RRC TRANSFER message to the CU 1 to forward the received measurement report. Based on the measurement report, the CU 1 decides a conditional mobility (i.e., conditional PSCell change) of the UE 3 from a cell of the source DU 2A to a cell of the target DU 2B.

In step 1003, the CU 1 sends a UE CONTEXT SETUP REQUEST message to the target DU 2B to create a UE context and set up one or more bearers. The UE CONTEXT SETUP REQUEST message may request the target DU 2B to provide a configuration (e.g., CellGroupConfig) of radio resources of the PSCell. To explicitly or implicitly indicate that it is a request of a conditional mobility (i.e., conditional PSCell change), a "CG-ConfigInfo" information element contained in a "CU to DU RRC Information" information element within the UE CONTEXT SETUP REQUEST message may be used. Alternatively, to explicitly or implicitly indicate that it is a conditional mobility request, a new information element may be defined (or introduced) in the UE CONTEXT SETUP REQUEST message.

In step 1004, the target DU 2B responds to the CU 1 with a UE CONTEXT SETUP RESPONSE message. In response to receiving the conditional mobility request, the target DU 2B may determine if the conditional mobility (i.e., conditional PSCell change) is acceptable. The target DU 2B may include in the UE CONTEXT SETUP RESPONSE message an information element indicating whether the conditional mobility is acceptable (step 1004).

In step 1005, the CU 1 sends to the MN 4 an SN MODIFICATION REQUIRED message including an RRC message (e.g., NR RRCReconfiguration message) of SN RAT (e.g., NR) generated by the CU 1. The RRC message includes an initiation (or execution) condition of the conditional mobility (i.e., conditional PSCell change, or conditional Reconfiguration with sync for PSCell change). As described above, the initiation (or execution) condition of the conditional mobility may be, for example, a threshold and a TTT. Alternatively, the initiation (or execution) condition of the conditional mobility may be a reception of an explicit execution instruction (e.g., predetermined signaling) from the network. In this case, the reception by the UE 3 of a configuration (e.g., radio parameter) to be used to receive the execution instruction may implicitly indicate to the UE 3 that the initiation (or execution) condition of the conditional mobility is the reception of the execution instruction. In other words, if the UE 3 receives this configuration (e.g., radio parameter), the UE 3 may determine (or understand) that the initiation (or execution) condition of the conditional mobility associated therewith is the reception of the execution instruction (e.g., predetermined signaling).

In addition, the RRC message may include a condition (e.g., offset) for the UE 3 to exit the conditional PSCell change and a value of a validity timer. The value of the validity timer may indicate how long the resources of the candidate target cell (i.e., candidate cell to be used as the PSCell after the change) are valid. Alternatively, the value of the validity timer may indicate a period (or time) during which access to the candidate target cell is permitted, or a period (or time) during which the configuration for the conditional mobility is valid.

More specifically, the CU 1 may determine the initiation condition of the conditional mobility and include it in a CG-ConfigInfo information element or new information element contained in the UE CONTEXT SETUP REQUEST message (step 1003). Thereafter, the target DU 2B may generate a radio resource configuration (e.g., CellGroupConfig) containing the initiation condition of the conditional mobility, and include it in the UE CONTEXT SETUP RESPONSE message (step 1004). Moreover, the CU 1 may generate an RRC message of SN RAT containing the received radio resource configuration (e.g., CellGroupConfig) and include it in the SN MODIFICATION REQUIRED message (step 1005).

Alternatively, the CU 1 may determine an initiation condition of the conditional mobility and include it in a new information element in the SN MODIFICATION REQUIRED message (step 1005).

Further alternatively, the target DU 2B may determine an initiation condition of the conditional mobility. In this case, the target DU 2B may determine the initiation condition of the conditional mobility in response to the conditional mobility request (step 1003), and include the decided initiation condition in a CellGroupConfig information element or new information element in the UE CONTEXT SETUP RESPONSE message (step 1004). Thereafter, the CU 1 may generate an RRC message of SN RAT containing the CellGroupConfig information element or new information element, which includes the initiation condition of the conditional mobility, and then include it in the SN MODIFICATION REQUIRED message (step 1005).

If one or both of data forwarding and an SN security key change need to be applied, the MN 4 may perform an MN initiated SN Modification procedure and apply a forwarding address or new SN security key information or both to the CU 1 by using an SN Modification Request message.

In step 1006, the CU 1 sends a UE CONTEXT MODIFICATION REQUEST message to the source DU 2A. The message includes an indication of the conditional mobility (i.e., conditional PSCell change)

In step 1007, the MN 4 performs an RRC reconfiguration procedure (e.g., LTE RRC Connection Reconfiguration procedure) of MN RAT (e.g., LTE) via an MCG SRB, and forwards the RRC message of SN RAT received from the CU 1 to the UE 3. The UE 3 transmits to the MN 4 an RRC message (e.g., LTE RRC Connection Reconfiguration Complete message) of MN RAT containing an RRC response message (e.g., NR RRC Reconfiguration Complete message) of SN RAT destined for the CU 1.

In step 1008, the MN 4 responds to the CU 1 with an SN MODIFICATION CONFIRM message upon successfully completing the RRC reconfiguration procedure of MN RAT. The SN MODIFICATION CONFIRM message contains the RRC response message (e.g., NR RRC Reconfiguration Complete message) of SN RAT received from the UE 3.

The UE 3 maintains the connection with the source DU 2A after receiving the RRC message of SN RAT (step 1007). If the execution condition of the conditional mobility (i.e., conditional Reconfiguration with sync) configured by the RRC message of SN RAT is satisfied (step 1009), then the UE 3 applies a new configuration and initiates access (i.e., random access procedure) to the targets DU 2B (step 1012). The UE 3 may transmit to the source DU 2A an indication (or a report) of conditional mobility initiation (step 1010). The indication of conditional mobility initiation from the UE 3 may be uplink control information (UCI) transmitted via a PUCCH. Alternatively, the indication of conditional mobility initiation may be a MAC CE. The source DU 2A may determine in advance and notify the UE 3 via the CU 1 of a configuration of a radio resource to be used for the indication of CHO initiation. For example, the source DU 2A may include the configuration of the radio resource to be used for the indication of conditional mobility initiation in information (e.g., CellGroupConfig) contained in the UE CONTEXT SETUP RESPONSE message, and send it to the CU 1. Thereafter, the CU 1 may generate an RRCReconfiguration message containing the configuration of the radio resource to be used for the indication of conditional mobility initiation, and transmit it to the UE 3. If there are a plurality of candidate target cells (e.g., PSCell candidates), the indication of conditional mobility initiation may include information which explicitly or implicitly indicates the selected candidate target cell (e.g., the candidate target cell for which the PSCell change has been triggered).

In step 1011, the source DU 2A responds to the CU 1 with a UE CONTEXT MODIFICATION RESPONSE message. In an example, the source DU 2A may send the UE CONTEXT MODIFICATION RESPONSE message (step 1011) in response to receiving the indication of conditional mobility initiation (step 1010) from the UE 3. In this case, the UE CONTEXT MODIFICATION RESPONSE message can also be used to report the initiation (or execution) of the conditional mobility to the CU 1. In another example, the source DU 2A may send the UE CONTEXT MODIFICATION RESPONSE message (step 1011) regardless of receiving the indication of conditional mobility initiation (step 1010). The source DU 2A may send the UE CONTEXT MODIFICATION RESPONSE message (step 1011) prior to receiving the indication of conditional mobility initiation (step 1010).

Although not shown in FIG. 10, the CU 1 may send a UE CONTEXT RELEASE COMMAND message to the source DU 2A after receiving the UE CONTEXT MODIFICATION RESPONSE message (step 1011). Instead, the CU 1 may send a UE CONTEXT RELEASE COMMAND message to the source DU 2A after receiving a DDDS frame (not shown) from the source DU 2A. In this case, a release Cause value attached to (or included in) the UE CONTEXT RELEASE COMMAND message may be, for example, "Handover Condition Met", "Action Desirable for Radio Reasons", "Handover Complete", or "Normal Release". The source DU 2A may release the UE context regarding the UE 3 and respond to the CU 1 with a UE CONTEXT RELEASE COMPLETE message.

Figure 11:
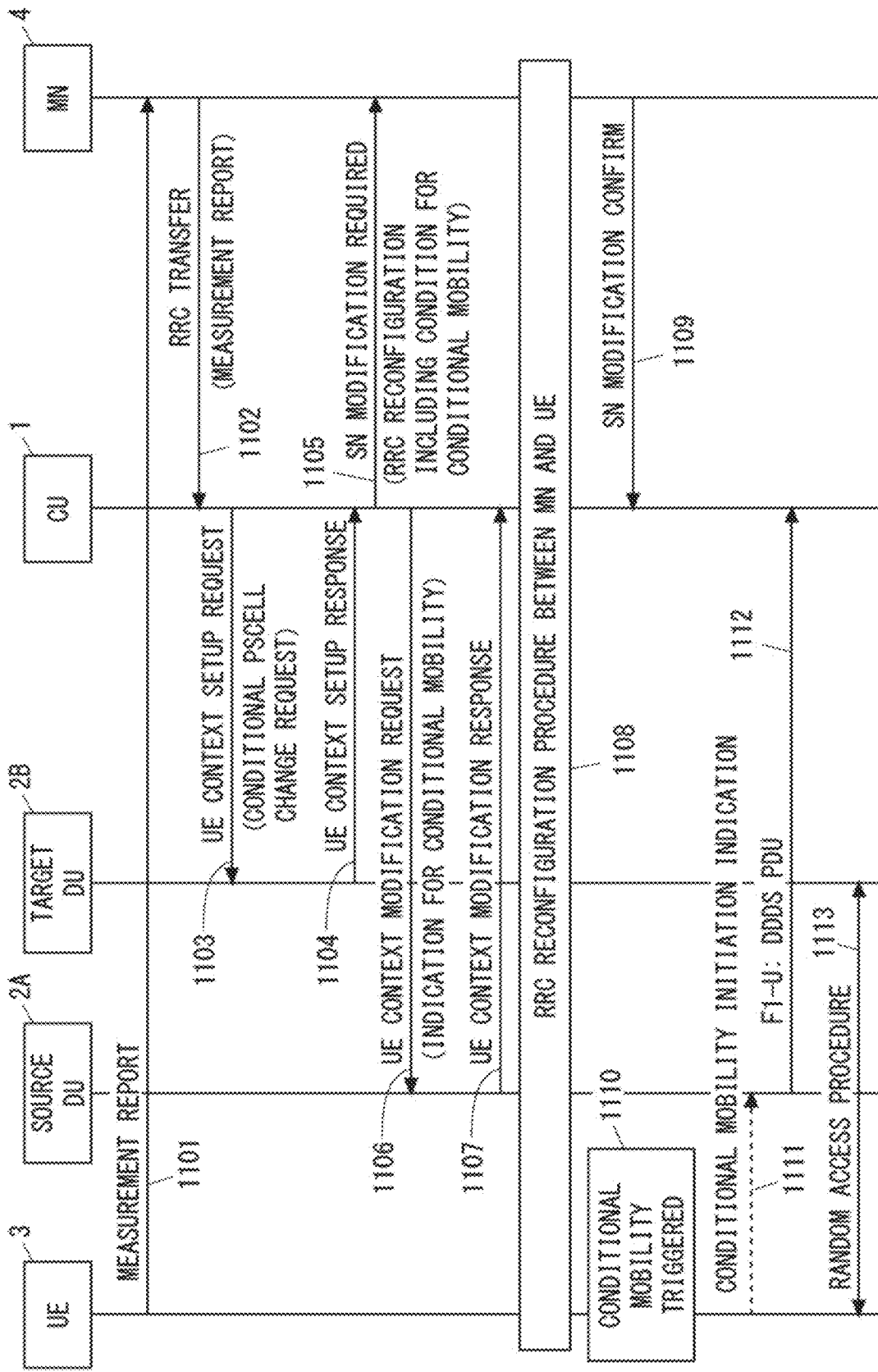
FIG. 11 is a sequence diagram showing an example of signaling according to the fifth embodiment.

FIG. 11 shows another example of an intra-CU inter-DU conditional PSCell Change procedure. The processing of steps 1101 to 1106 is similar to that of steps 1001 to 1006 of FIG. 10. In step 1107, the source DU 2A responds to the CU 1 with a UE CONTEXT MODIFICATION RESPONSE message.

The processing of steps 1108 and 1109 is similar to the processing of steps 1007 and 1008 of FIG. 10. Specifically, in step 1108, the MN 4 performs an RRC reconfiguration procedure (e.g., LTE RRC Connection Reconfiguration procedure) of MN RAT (e.g., LTE) via an MCG SRB, forwarding to the UE 3 an RRC message (e.g., NR RRC Reconfiguration message) of SN RAT (e.g., NR) received from the CU 1. The UE 3 transmits to the MN 4 an RRC response message (e.g., LTE RRC Connection Reconfiguration Complete message) of MN RAT which contains an RRC response message (e.g., NR RRC Reconfiguration Complete message) of SN RAT destined for the CU 1. In step 1109, the MN 4 responds to the CU 1 with an SN MODIFICATION CONFIRM message in response to successfully completing the RRC reconfiguration procedure of MN RAT. The SN MODIFICATION CONFIRM message contains the RRC response message (e.g., NR RRC Reconfiguration Complete message) of SN RAT received from the UE 3.

In step 1110, the UE 3 determines satisfaction of the execution condition of the conditional mobility (i.e., conditional Reconfiguration with sync) configured by the RRC message of SN RAT, applies a new configuration, and initiates access (i.e., random access procedure) to the target DU 2B (step 1113). The UE 3 may transmit an indication of conditional mobility initiation to the source DU 2A (step 11110).

In step 1112, the source DU 2A send a DDDS frame to the CU 1. In an example, the source DU 2A may send the DDDS frame (step 1112) in response to receiving the indication of conditional mobility initiation (step 1111) from the UE 3. In this case, the DDDS frame can be also used to report initiation (or execution) of the conditional mobility to the CU 1. Instead, although not illustrated, the source DU 2A may send a new message to the CU 1 to indicate the initiation (or execution) of the conditional mobility, in addition to a DDDS frame as used in normal (i.e., non-conditional) mobility. This message may be referred to as a CONDITIONAL MOBILITY TRIGGERED (or INITIATED, DETECTED, INDICATION, or INSTRUCTION) message. In another example, the source DU 2A may send the DDDS frame (step 1112) regardless of receiving the indication of conditional mobility initiation (step 1111). The source DU 2A may send the DDDS frame (step 1112) prior to receiving the indication of conditional mobility initiation (step 1111).

Although not shown in FIG. 11, the CU 1 may send a UE CONTEXT RELEASE COMMAND message to the source DU 2A after receiving the DDDS frame (step 1112). In this case, a release Cause value attached to (or included in) the UE CONTEXT RELEASE COMMAND message may be, for example, "Handover Condition Met", "Action Desirable for Radio Reasons", "Handover Complete", or "Normal Release". The source DU 2A may release the UE context regarding the UE 3 and respond to the CU 1 with a UE CONTEXT RELEASE COMPLETE message.

The procedures described in the present embodiment enable an intra-CU inter-DU conditional PSCell change.

Sixth Embodiment

The present embodiment provides specific examples of signaling for conditional mobility. The configuration example of a radio communication network according to the present embodiment may be similar to the example shown in FIGS. 1 and 2.

Figure 12:
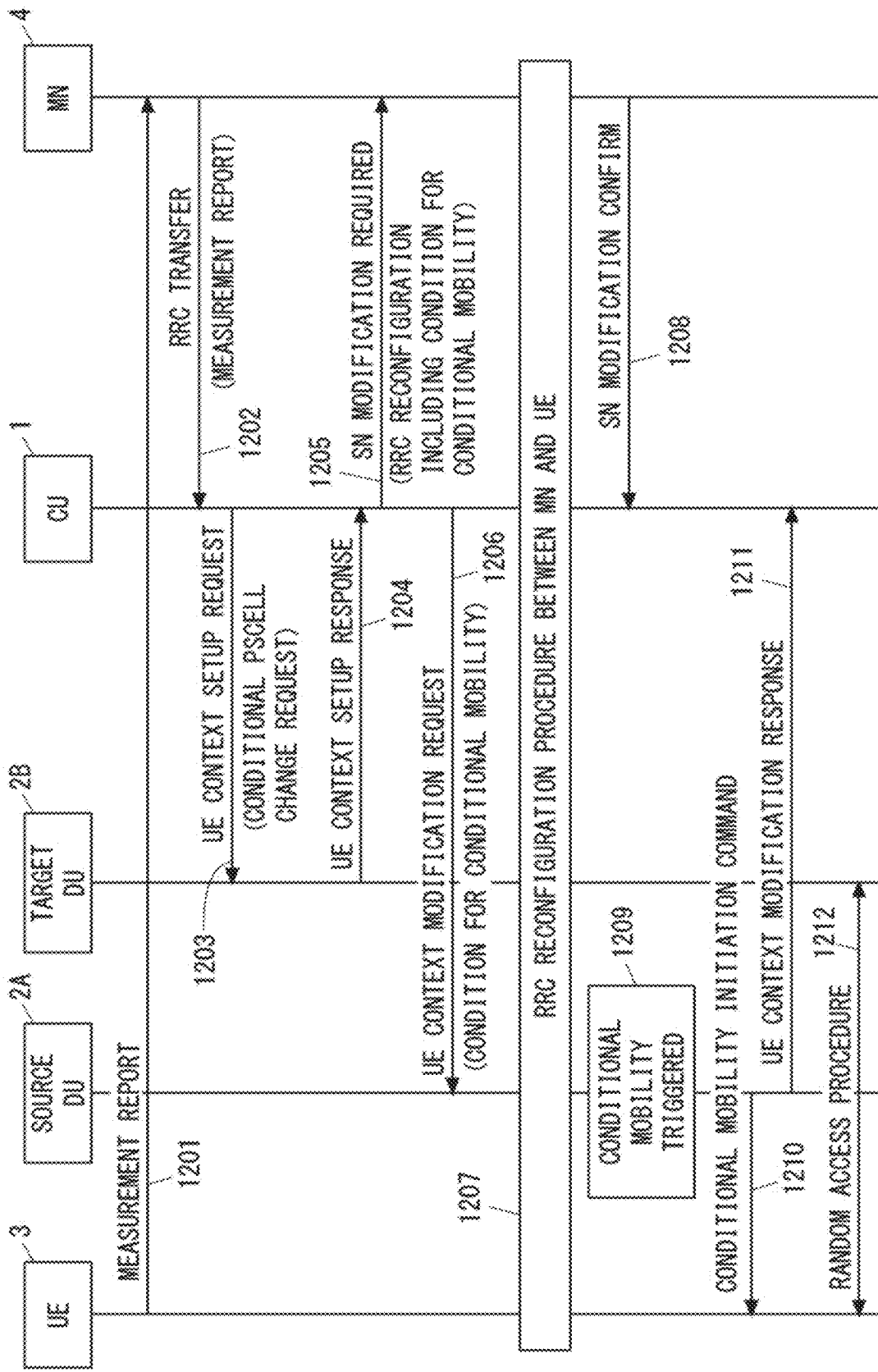
FIG. 12 is a sequence diagram showing an example of signaling according to a sixth embodiment.

FIG. 12 shows an example of an intra-CU inter-DU conditional PSCell Change procedure. The processing of steps 1201 to 1208 is similar to that of steps 1001 to 1008 of FIG. 10. However, a UE CONTEXT MODIFICATION REQUEST message in step 1206 indicates a condition for conditional mobility (i.e., conditional PSCell change, or conditional Reconfiguration with sync).

In step 1209, a source DU 2A autonomously determines satisfaction of the execution condition of the conditional mobility (i.e., conditional PSCell change, or conditional Reconfiguration with sync). In step 1210, the source DU 2A sends a conditional mobility initiation command to the UE 3 in response to the satisfaction of the execution condition of the conditional mobility. The conditional mobility initiation command may be downlink control information (DCI) transmitted through a PDCCH. Instead, the conditional mobility initiation command may be a MAC CE. The source DU 2A may determine in advance and notify the UE 3 via the CU 1 of a configuration of a radio resource to be used for the conditional mobility initiation command. For example, the source DU 2A may include the configuration of the radio resource to be used for the conditional mobility initiation command in information (e.g., CellGroupConfig) contained in a UE CONTEXT SETUP RESPONSE message, and send it to the CU 1. Thereafter, the CU 1 may generate an RRCReconfiguration message including the configuration of the radio resource to be used for the conditional mobility initiation command, and transmit it to the UE 3. If there are a plurality of candidate target cells (e.g., PSCell candidates), the conditional mobility initiation command may include information that explicitly or implicitly indicates the selected candidate target cell (e.g., the candidate target cell for which the PSCell change has been triggered).

In step 1211, the source DU 2A responds to the CU 1 with a UE CONTEXT MODIFICATION RESPONSE message. In one example, the source DU 2A may send the UE CONTEXT MODIFICATION RESPONSE message (step 1211) in response to satisfaction of the execution condition of the conditional mobility. In this case, the UE CONTEXT MODIFICATION RESPONSE message can be also used to report the initiation (or execution) of the conditional mobility to the CU 1. In another example, the source DU 2A may send the UE CONTEXT MODIFICATION RESPONSE message (step 1211) regardless of the satisfaction of the execution condition of the conditional mobility. The source DU 2A may send the UE CONTEXT MODIFICATION RESPONSE message (step 1211) prior to the satisfaction of the execution condition of the conditional mobility. In step 1212, the UE 3 initiates access (i.e., random access procedure) to the target DU 2B in response to receiving the conditional mobility initiation command.

Although not shown in FIG. 12, the CU 1 may send a UE CONTEXT RELEASE COMMAND message to the source DU 2A after receiving the UE CONTEXT MODIFICATION RESPONSE message (step 1211). Instead, the CU 1 may send a UE CONTEXT RELEASE COMMAND message to the source DU 2A after receiving a DDDS frame (not shown) from the source DU 2A. In this case, a release Cause value attached to (or included in) the UE CONTEXT RELEASE COMMAND message may be, for example, "Handover Condition Met", "Action Desirable for Radio Reasons", "Handover Complete", or "Normal Release". The source DU 2A may release the UE context regarding the UE 3 and respond to the CU 1 with a UE CONTEXT RELEASE COMPLETE message.

Figure 13:
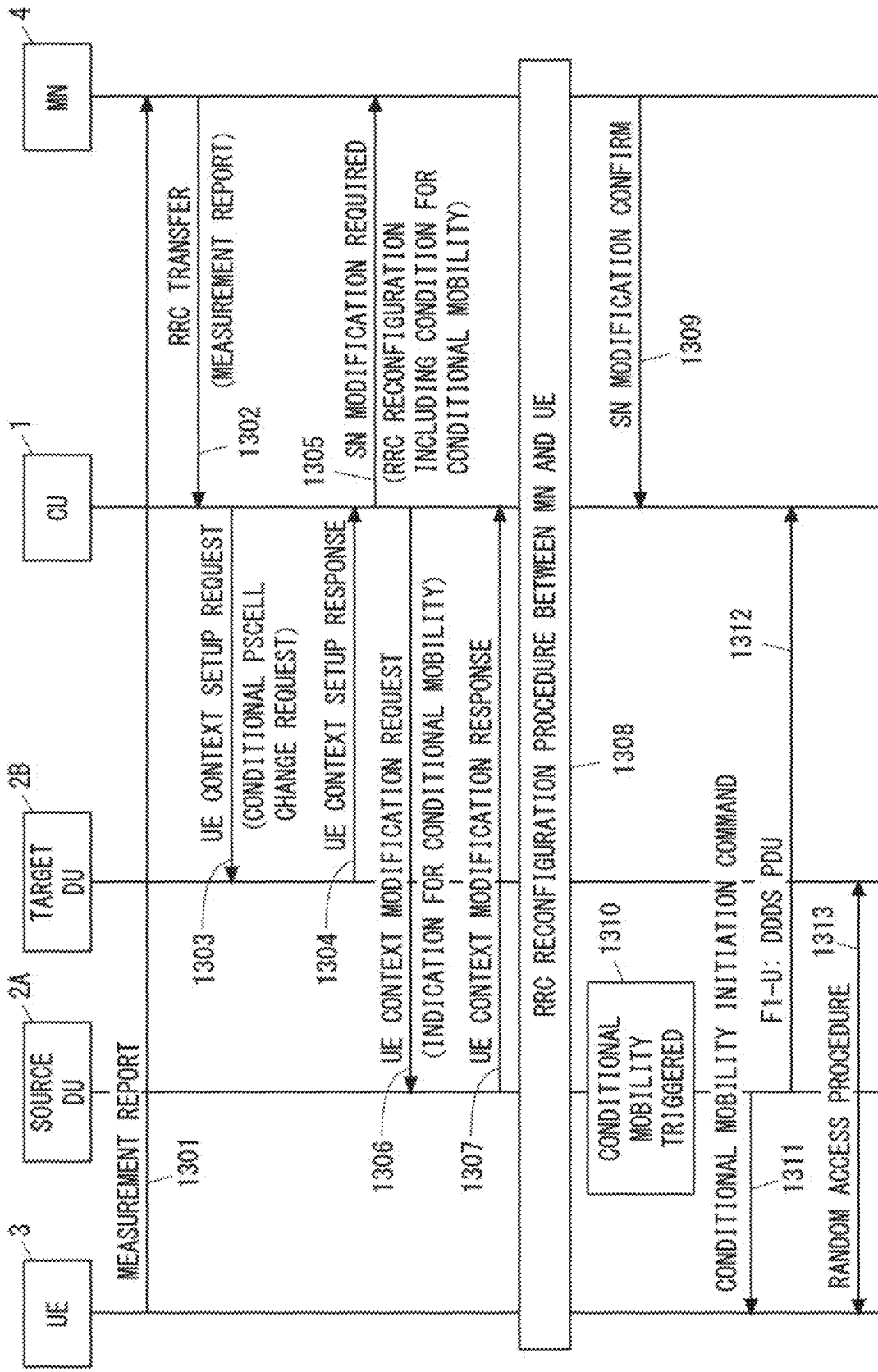
FIG. 13 is a sequence diagram showing an example of signaling according to the sixth embodiment.

FIG. 13 shows another example of an intra-CU inter-DU conditional PSCell Change procedure. The processing of steps 1301 to 1306 is similar to that of steps 1201 to 1206 of FIG. 12. In step 1307, the source DU 2A responds to the CU 1 with a UE CONTEXT MODIFICATION RESPONSE message.

The processing of steps 1308 and 1309 is similar to the processing of steps 1207 and 1208 of FIG. 12. Specifically, in step 1308, the MN 4 performs an RRC reconfiguration procedure (e.g., LTE RRC Connection Reconfiguration procedure) of MN RAT (e.g., LTE) via an MCG SRB, forwarding to the UE 3 an RRC message (e.g., NR RRC Reconfiguration message) of SN RAT (e.g., NR) received from the CU 1. The UE 3 transmits to the MN 4 an RRC response message (e.g., LTE Connection Reconfiguration Complete message) of MN RAT which contains an RRC response message (e.g., NR RRC Reconfiguration Complete message) of SN RAT destined for the CU 1. In step 1309, the MN 4 responds to the CU 1 with an SN MODIFICATION CONFIRM message in response to successfully completing the RRC reconfiguration procedure of MN RAT. The SN MODIFICATION CONFIRM message contains the RRC response message (e.g., NR RRC Reconfiguration Complete message) of SN RAT received from the UE 3.

In step 1310, the source DU 2A autonomously determines satisfaction of the execution condition of the conditional mobility (i.e., conditional PSCell change, or conditional Reconfiguration with sync). In step 1311, source DU 2A sends a conditional mobility initiation command to the UE 3 in response to the satisfaction of the execution condition of the conditional mobility. The conditional mobility initiation command may be DCI transmitted through a PDCCH. Alternatively, the conditional mobility initiation command may be a MAC CE.

In step 1312, the source DU 2A sends a DDDS frame to the CU 1. In an example, the source DU 2A may send the DDDS frame (step 1312) in response to the satisfaction of the execution condition of the conditional mobility. In this case, the DDDS frame can be also used to report initiation (or execution) of the conditional mobility to the CU 1. Alternatively, although not illustrated, the source DU 2A may send to the CU 1 a new message to indicate initiation (or execution) of the conditional mobility, in addition to a DDDS frame as used in a normal (i.e., non-conditional) mobility. This message may be referred to as a CONDITIONAL MOBILITY TRIGGERED (or INITIATED, DETECTED, INDICATION, or INSTRUCTION) message. In another example, the source DU 2A may send the DDDS frame (step 1312) regardless of satisfaction of the execution condition of the conditional mobility. The source DU 2A may send the DDDS frame (step 1312) prior to satisfaction of the execution condition of the conditional mobility.

Although not shown in FIG. 13, the CU 1 may transmit a UE CONTEXT RELEASE COMMAND message to the source DU 2A after receiving the DDDS frame (step 1312). In this case, a release Cause value attached to (or included in) the UE CONTEXT RELEASE COMMAND message may be, for example, "Handover Condition Met", "Action Desirable for Radio Reasons", "Handover Complete", or "Normal Release". The source DU 2A may release the UE context regarding the UE 3 and respond to the CU 1 with a UE CONTEXT RELEASE COMPLETE message.

The procedures described in the present embodiment enable an intra-CU inter-DU conditional PSCell change.

Seventh Embodiment

The present embodiment provides specific examples of signaling for conditional mobility. The configuration example of a radio communication network according to the present embodiment may be similar to the example shown in FIGS. 1 and 2.

A UE 3 may initiate a conditional mobility (e.g., CHO) in response to receiving a conditional mobility initiation command from a source DU 2A (or CU 1). In other words, a mobility initiation condition configured in the UE 3 for the conditional mobility may be a reception of explicit signaling (e.g., conditional mobility initiation command) from a network (e.g., source DU 2A).

The conditional mobility initiation command may be a signal in a layer (e.g., MAC layer, physical layer) lower than the layer (e.g., RRC layer) of the message (e.g., RRC message) which is sent from the network to the UE 3 to configure the mobility initiation condition in the UE 3. More specifically, the conditional mobility initiation command may be DCI (i.e., physical layer signaling) transmitted via a PDCCH, or may be a MAC CE (i.e., MAC layer signaling). In general, signaling in the physical layer and MAC layer can be transmitted more frequently than signaling in the RRC layer. In other words, the intervals between transmission opportunities of the signaling in the physical layer and the MAC layer are shorter than those of the signaling in the RRC layer. Therefore, using signaling in a layer lower than the RRC layer can contribute to rapid transmission of the conditional mobility initiation command to the UE 3.

Besides, using signaling in a layer (e.g., MAC layer, physical layer) lower than an RRC layer for the transmission of the conditional mobility initiation command is effective especially in the SN Modification with MN involvement including the inter-gNB-DU mobility using MCG SRB. In the SN Modification with MN involvement, RRC signaling for conditional mobility (e.g., conditional PSCell change) is transmitted via an MCG SRB. Thus, the transmission of the RRC signaling from the secondary node (SN) (i.e., source DU 2A and CU 1) to the UE 3 is delayed due to the intervention of the master node (MN). In contrast, signaling of the MAC layer or the physical layer from the SN (i.e., source DU 2A and CU 1) to the UE 3 can be transmitted directly to the UE 3 via a physical channel of a cell served by the SN (i.e., source DU 2A and CU 1). Thus, by using signaling in a layer (e.g., MAC layer, physical layer) lower than the RRC layer to transmit the conditional mobility initiation command, the SN (i.e., source DU 2A and CU 1) can reduce the delay required for transmitting this command to the UE 3.

As can be understood from the above description, the signaling procedure described in this embodiment is also effective when the CU-DU split is not applied. For example, in the case of the SN Modification with MN involvement, the SN may transmit a conditional mobility initiation command using signaling in a layer (e.g., MAC layer, physical layer) lower than the RRC layer. This allows the conditional mobility initiation command to be transmitted directly to the UE 3 through a physical channel of a cell served by the SN, without via an MCG SRB. This can contribute to reduction of the delay required for transmitting the conditional mobility initiation command to the UE 3.

Figure 14:
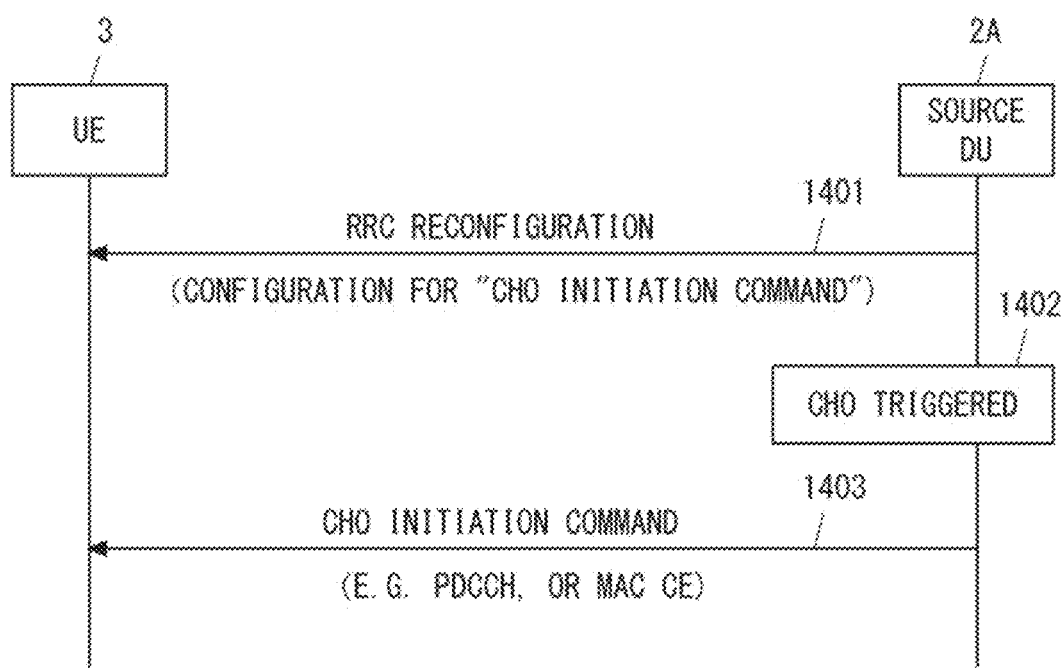
FIG. 14 is a sequence diagram showing an example of signaling according to a seventh embodiment.

FIG. 14 shows an example of signaling according to the present embodiment. In step 1401, the source DU 2A (or CU 1) transmits an RRC message (e.g., RRC Reconfiguration message) containing a configuration for a conditional mobility initiation command. Although not illustrated, the source DU 2A may determine the configuration for the conditional mobility initiation command, and send it to the CU 1, for example, via a DU To CU RRC Information information element. Thereafter, the CU 1 may generate an RRC message containing the configuration and transmit it to the UE 3 via the source DU 2A. Furthermore, if the CU 1 and DU 2A are an SN (e.g., SgNB) of DC, the RRC message may be sent to the UE 3 via the MN (e.g., MeNB) (i.e., via an SRB of an MCG cell).

The configuration for the conditional mobility initiation command may indicate identification information of the conditional mobility initiation command. Further or alternatively, the configuration may indicate a resource for transmitting the conditional mobility initiation command. More specifically, the configuration may indicate an index of the conditional mobility initiation command or may indicate a time/frequency/code resource for transmitting the conditional mobility initiation command. The configuration may be a PDCCH-Config used to configure PDCCH parameters (e.g., Downlink Control Information (DCI)) dedicated to the UE 3.

In step 1402, the source DU 2A (or CU 1) determines satisfaction of the execution condition of the conditional mobility (e.g., CHO). In step 1403, the source DU 2A sends to the UE 3 the conditional mobility initiation command (e.g., CHO initiation command) in response to the satisfaction of the execution condition of the conditional mobility. The transmission of the conditional mobility initiation command follows the configuration provided in advance to the UE 3 in step 1401.

The procedure of FIG. 14 may be performed for a CHO by a source node (e.g., source gNB, or source eNB) to which the CU-DU split has not been applied. The procedure in FIG. 14 may be performed for a conditional PSCell change with MR-DC by an SN to which the CU-DU split has not been applied.

Eighth Embodiment

The present embodiment provides specific examples of signaling for conditional mobility. A configuration example of a radio communication network according to the present embodiment may be similar to the example shown in FIGS. 1 and 2. In the present embodiment, a plurality of candidate target cells may be served by a plurality of DUs 2.

Figure 15:
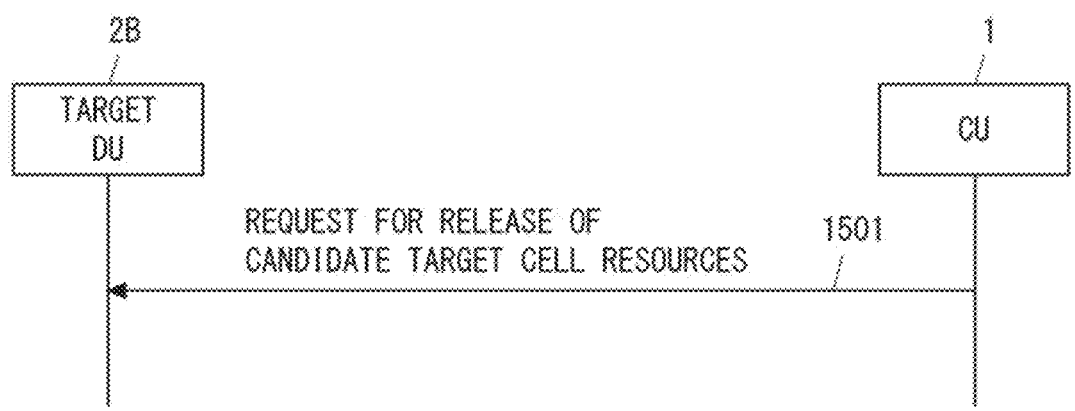
FIG. 15 is a sequence diagram showing an example of signaling according to an eighth embodiment.

FIG. 15 is a diagram showing an example of signaling regarding intra-CU inter-DU conditional mobility (e.g., CHO). In step 1501, a CU 1 sends a request to release the resources of a candidate target cell(s) to one or more target DUs 2B. In the case of an inter-DU handover, the request requests each target DU 2B to release the resources of one or more candidate target cells reserved for the conditional handover. The CU 1 may send the request to target DUs 2B which manage candidate target cells different from the target cell to which the UE 3 is moving. On the other hand, in the case of an inter-DU PSCell change, the request requests each target DU 2B to release the resources of one or more candidate target PSCells reserved for the conditional PSCell change (or conditional Reconfiguration with sync). The CU 1 may send the request to target DUs 2B which manage candidate target PSCells different from the target PSCell to which the UE 3 is moving.

The message transmitted in step 1501 for requesting resource release may be, for example, a UE CONTEXT RELEASE COMMAND message. In this case, a release Cause value attached to (or included in) the UE CONTEXT RELEASE COMMAND message is, for example, "Handover Condition Met", "Action Desirable for Radio Reasons", "Handover Complete", "Normal Release", or "Candidate Target Cell Found".

For example, the CU 1 may send the request of step 1501 if it detects that the UE 3 has completed a conditional mobility. The CU 1 may detect the completion of the conditional mobility by the fact that it has received3 from any target DU 2B a message (e.g., UPLINK RRC TRANSFER message carrying RRCReconfigurationComplete message) indicating a success of the conditional mobility of the UE. If the CU 1 and DU 2A is an SN of DC, the CU 1 may detect the completion of the conditional mobility by the fact that it has received from the UE 3 via an MN (e.g., MeNB) a message (e.g., RRCReconfigurationComplete message) indicating a success of the conditional mobility of the UE 3.

Alternatively, the CU 1 may send the request of step 1501 if it detects that the UE 3 has executed (or initiated) a conditional mobility. The CU 1 may detect a mobility execution (or initiation) by the fact that it has received an indication (e.g., measurement report) of initiation of the conditional mobility from the UE 3 or any target DU 2B.

According to such an operation, for example, the target DU 2B can release the resources reserved for the conditional mobility, in response to a request from the CU 1 without waiting for expiration of a validity timer.

Besides, if the UE 3 has completed a conditional mobility to any candidate target cell, it may autonomously release the resources (i.e., radio resource configuration) of the other candidate target cells. Alternatively, the UE 3 may release the resources of the other candidate target cells in response to receiving a release request from the network (e.g., CU 1, or target DU 2B) after completing the conditional mobility.

Ninth Embodiment

The configuration example of a radio communication network according to the present embodiment may be similar to the example shown in FIGS. 1 and 2. The present embodiment provides improvement in a control message sent from a source DU 2A to a CU 1 to indicate downlink data that has not been transmitted to a UE 3. The control message may be, for example, but not limited to, a DOWNLINK DATA DELIVERY STATUS (DDDS) frame used in LTE and NR.

As described in the first to third embodiments, as well as to indicate downlink data not yet transmitted to the UE 3, a DDDS frame may be also used to report initiation (or execution) of conditional mobility (e.g., CHO) to the CU 1. The DDDS frame may explicitly indicate initiation (or execution) of conditional mobility. For example, the DDDS frame may include one or more bits to indicate initiation (or execution) of conditional mobility.

FIG. 16 shows an example of the format of the DDDS frame that has been improved to explicitly indicate initiation (or execution) of a CHO. In the example of FIG. 16, the DDDS frame contains a Conditional Handover Met bit 1601. The bit 1601 indicates whether or not a CHO execution (or initiation) is satisfied. The bit 1601 may be used to indicate another conditional mobility in place of, or in addition to, a CHO.

The value of the bit 1601 may be set to 1 if the execution (or initiation) condition of the conditional mobility is satisfied, and set to be 0 otherwise. In this case, when the value of the bit 1601 is set to 1, this bit indicates a Conditional Handover indication. The Conditional Handover indication is signaled when the execution (or initiation) condition of the conditional mobility is satisfied. For example, upon receiving the Conditional Handover indication, the node (e.g., CU 1) hosting an NR PDCP entity may recognize that no more uplink or downlink data will be transmitted between the corresponding node (e.g., DU 2) and the UE 3.

The control message (e.g., DDDS frame) according to the present embodiment allows the DU 2 not only to indicate downlink data not yet transmitted to the UE 3, but also to report initiation (or execution) of a conditional mobility (e.g., CHO) to the DU 3.

Figure 17:
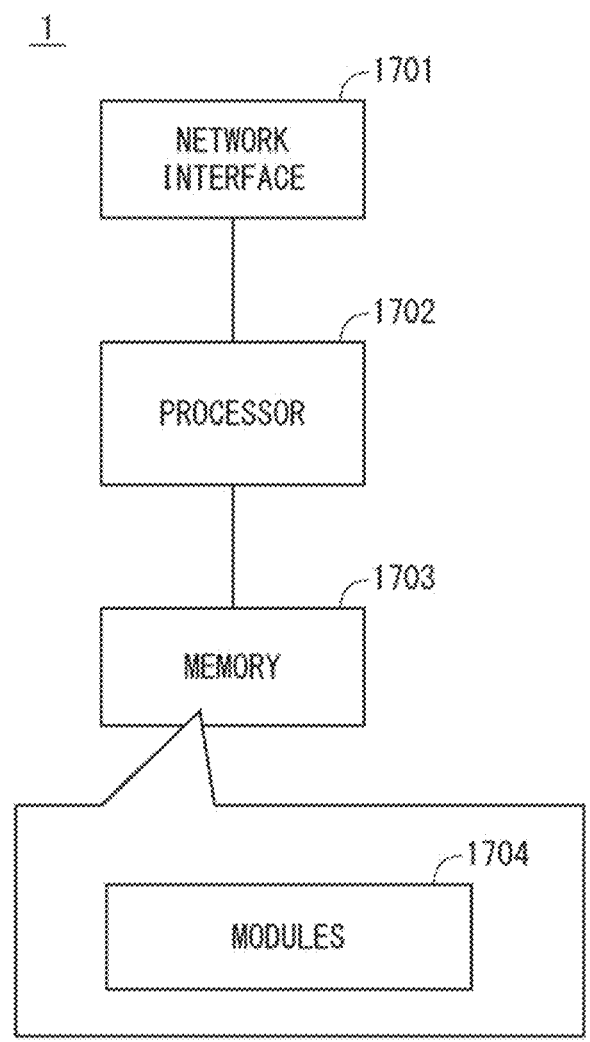
FIG. 17 is a block diagram showing a configuration example of a central node (e.g., gNB-CU) according to embodiments.

The following provides configuration examples of the CU 1, the DU 2, and the UE 3 according to the above-described embodiments. FIG. 17 is a block diagram showing a configuration example of the CU 1 2 according to the above-described embodiments. The configurations of the CU-CP 11 and the CU-UP 12 may be similar to that shown in FIG. 17. Referring to FIG. 17, the CU 1 includes a network interface 1701, a processor 1702, and a memory 1703. The network interface 1701 is used to communicate with network nodes (e.g., the DU 2, and control plane (CP) and user plane (UP) nodes in a core network). The network interface 1701 may include a plurality of interfaces. The network interface 1701 may include, for example, an optical fiber interface for communication between the CU and the DU and a network interface conforming to the IEEE 802.3 series.

The processor 1702 performs digital baseband signal processing (i.e., data-plane processing) and control-plane processing for radio communication. The processor 1702 may include a plurality of processors. The processor 1702 may include, for example, a modem processor (e.g., a Digital Signal Processor (DSP)) that performs the digital baseband signal processing and a protocol stack processor (e.g., a Central Processing Unit (CPU) or a Micro Processing Unit (MPU)) that performs the control-plane processing.

The memory 1703 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1703 may include a storage located apart from the processor 1702. In this case, the processor 1702 may access the memory 1703 via the network interface 1701 or an I/O interface (not shown).

The memory 1703 may store one or more software modules (computer programs) 1704 including instructions and data to perform processing by the CU 1 described in the above embodiments. In some implementations, the processor 1703 may be configured to load the software modules 1704 from the memory 17003 and execute the loaded software modules, thereby performing processing of the CU 1 described in the above embodiments.

Figure 18:
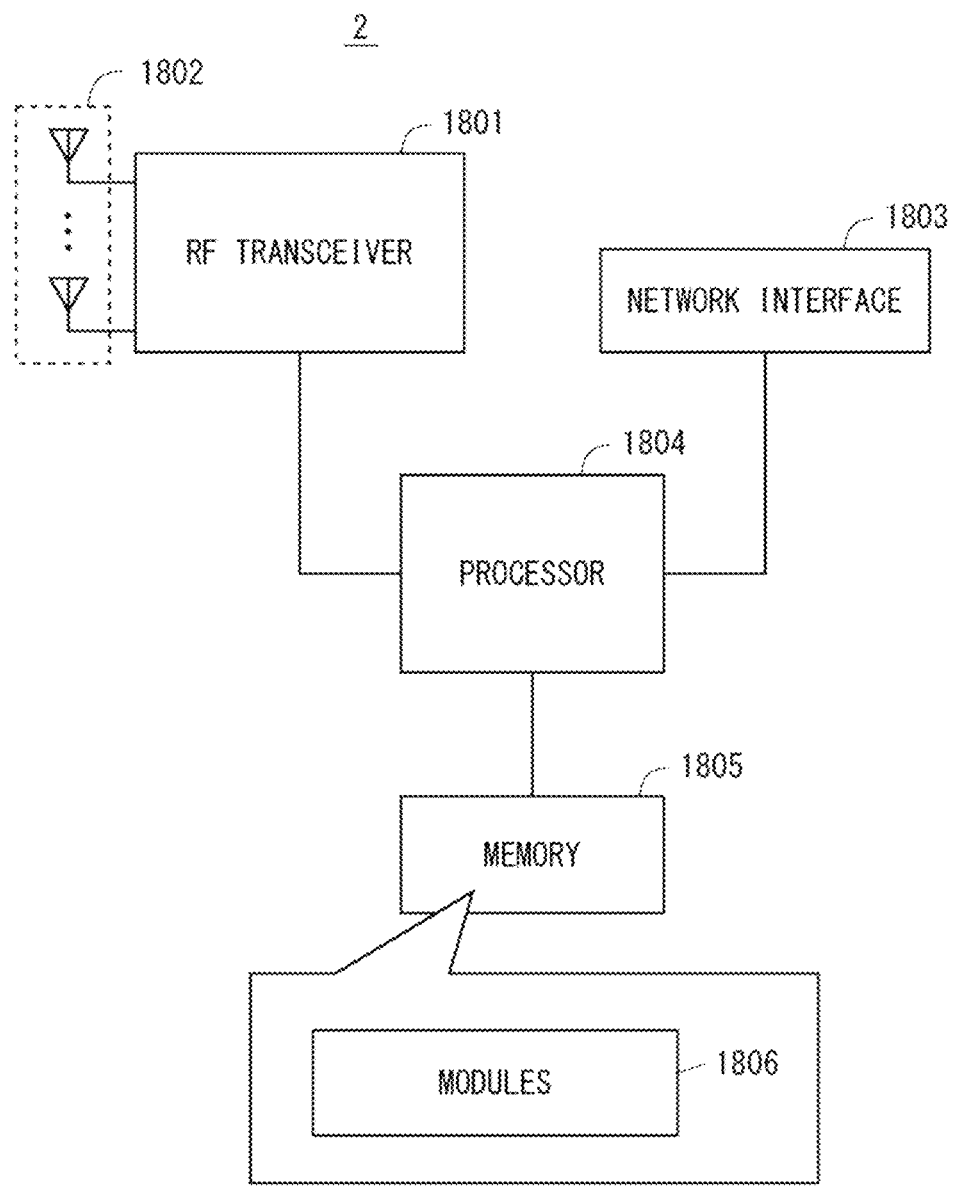
FIG. 18 is a block diagram showing a configuration example of a distributed node (e.g., gNB-DU) according to embodiments.

FIG. 18 is a block diagram showing a configuration example of the DU 2 according to the above-described embodiments. Referring to FIG. 18, the DU 2 includes a Radio Frequency transceiver 1801, a network interface 1803, a processor 1804, and a memory 1805. The RF transceiver 1801 performs analog RF signal processing to communicate with UEs. The RF transceiver 1801 may include a plurality of transceivers. The RF transceiver 1801 is coupled to an antenna array 1802 and the processor 1804. The RF transceiver 1801 receives modulated symbol data from the processor 1804, generates a transmission RF signal, and supplies the transmission RF signal to the antenna array 1802. The RF transceiver 1801 also generates a baseband received signal based on a received RF signal received by the antenna array 1802 and supplies the baseband received signal to the processor 1804. The RF transceiver 1801 may include an analog beamformer circuit for beam forming. The analog beamformer circuit includes, for example, a plurality of phase shifters and a plurality of power amplifiers.

The network interface 1803 is used to communicate with network nodes (e.g., the CU 1, the CU-CP 11, and the CU-UP 12). The network interface 1803 may include a plurality of interfaces. The network interface 1803 may include, for example, at least one of an optical fiber interfaces for communication between the CU and the DU or a network interface conforming to the IEEE 802.3 series.

The processor 1804 performs digital baseband signal processing (i.e., data-plane processing) and control-plane processing for radio communication. The processor1 804 may include a plurality of processors. The processor 1804 may include, for example, a modem processor (e.g., a DSP) that performs the digital baseband signal processing and a protocol stack processor (e.g., a CPU or an MPU) that performs the control-plane processing. The processor 1804 may include a digital beamformer module for beam forming. The digital beamformer module may include a Multiple Input Multiple Output (MIMO) encoder and a pre-coder.

The memory 1805 is composed of a combination of a volatile memory and a non-volatile memory. The volatile memory is, for example, an SRAM, a DRAM, or a combination thereof. The non-volatile memory is, for example, an MROM, an EEPROM, a flash memory, a hard disc drive, or any combination thereof. The memory 1805 may include a storage located apart from the processor 1804. In this case, the processor 1804 may access the memory 1805 via the network interface 1803 or an I/O interface (not shown).

The memory 1805 may store one or more software modules (computer programs) 1806 including instructions and data to perform processing by the DU 2 described in the above embodiments. In some implementations, the processor 1804 may be configured to load the software modules 1806 from the memory 1805 and execute the loaded software modules, thereby performing processing of the DU 2 described in the above embodiments.

Figure 19:
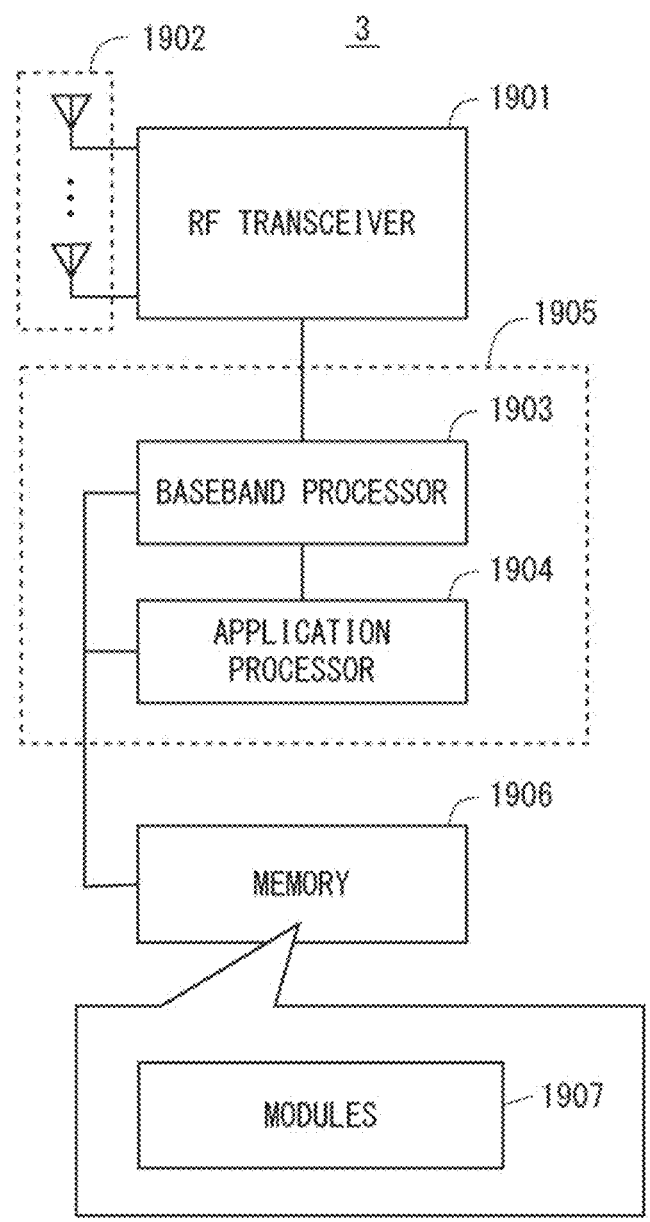
FIG. 19 is a block diagram showing a configuration example of a radio terminal according to embodiments.

FIG. 19 is a block diagram showing a configuration example of the UE 3. A Radio Frequency (RF) transceiver 1901 performs analog RF signal processing to communicate with a RAN node (e.g., DU 2). The RF transceiver 1901 may include a plurality of transceivers. The analog RF signal processing performed by the RF transceiver 1901 includes frequency up-conversion, frequency down-conversion, and amplification. The RF transceiver 1901 is coupled to an antenna array 1902 and a baseband processor 1903. The RF transceiver 1901 receives modulated symbol data (or OFDM symbol data) from the baseband processor 1903, generates a transmission RF signal, and supplies the transmission RF signal to the antenna array 1902. The RF transceiver 1901 also generates a baseband received signal based on a received RF signal received by the antenna array 1902 and supplies the baseband received signal to the baseband processor 1903. The RF transceiver 1901 may include an analog beamformer circuit for beam forming. The analog beamformer circuit includes, for example, a plurality of phase shifters and a plurality of power amplifiers.

The baseband processor 1903 performs digital baseband signal processing (i.e., data-plane processing) and control-plane processing for radio communication. The digital baseband signal processing includes, for example, (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1903 may include, for example, signal processing of a Service Data Adaptation Protocol (SDAP) layer, a Packet Data Convergence Protocol (PDCP) layer, a Radio Link Control (RLC) layer, a MAC layer, and a PHY layer. The control-plane processing performed by the baseband processor 1903 may also include processing of a Non-Access Stratum (NAS) protocol, an RRC protocol, and MAC CEs.

The baseband processor 1903 may perform MIMO encoding and pre-coding for beam forming.

The baseband processor 1903 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 1904 described in the following.

The application processor 1904 is also referred to as a CPU, an MPU, a microprocessor, or a processor core. The application processor 1904 may include a plurality of processors (processor cores). The application processor 1904 loads a system software program (Operating System (OS)) and various application programs (e.g., a call application, a WEB browser, a mailer, a camera operation application, and a music player application) from a memory 1906 or from another memory (not shown) and executes these programs, thereby providing various functions of the UE 3.

In some implementations, as represented by a dashed line (1905) in FIG. 19, the baseband processor 1903 and the application processor 1904 may be integrated on a single chip. In other words, the baseband processor 1903 and the application processor1 904 may be implemented in a single System on Chip (SoC) device 1905. An SoC device may be referred to as a Large Scale Integration (LSI) or a chipset.

The memory 1906 is a volatile memory, a non-volatile memory, or a combination thereof. The memory 1906 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 1906 may include, for example, an external memory device that can be accessed from the baseband processor 1903, the application processor 1904, and the SoC 1905. The memory 1906 may include an internal memory device that is integrated in the baseband processor 1903, the application processor 1904, or the SoC 1905. The memory 1906 may also include a memory in a Universal Integrated Circuit Card (UICC).

The memory 1906 may store one or more software modules (computer programs) 1907 including instructions and data to perform the processing by the UE 3 described in the above embodiments. In some implementations, the baseband processor 1903 or the application processor 1904 may load these software modules 1907 from the memory 1906 and execute the loaded software modules, thereby performing the processing of the UE 3 described in the above embodiments with reference to the drawings.

The control-plane processing and operations performed by the UE 3 described in the above embodiments can be achieved by elements other than the RF transceiver 1901 and the antenna array 1902, i.e., achieved by the memory 1906, which stores the software module 1907, and one or both of the baseband processor 1903 and the application processor 1904.

As described above with reference to FIGS. 17 to 19, each of the processors that the CU 1, the DU 2, and the UE 3 according to the above embodiments include executes one or more programs including instructions for causing a computer to execute an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

Other Embodiments

The signaling between the CU 1 and the DU 2 described in the above embodiments may be performed between the CU-CP 11 and the DU 2, or between the CU-UP 12 and the DU 2.

Each of the above embodiments may be used individually, or two or more of the embodiments may be appropriately combined with one another. These embodiments can be used independently of each other and contribute to solving different objects or problems from each other, as well as contributing to achieving effects different from each other.

The functions described as the conditional mobility in the above-described embodiments may be referred to as a pre-conditioned mobility, a prepared mobility, a delayed mobility, or the like. More specifically, the functions described as the conditional handover (CHO) may be referred to as a pre-conditioned HO, a prepared HO, a delayed HO, or the like. Similarly, the functions described as the conditional PSCell change in the above-described embodiments may be referred to as a pre-conditioned PSCell change, a pre-prepared PSCell change, a delayed PSCell change, or the like.

The conditional handovers (or reconfigurations with sync) described in the above embodiments may be, for example, but not limited to, an inter-gNB handover, an intra-gNB (inter-gNB-DU) handover, a handover between a gNB and an eNB/5GC (ng-eNB), an inter-eNB/5GC handover, or an intra-eNB/5GC (inter-eNB/5GC-DU) handover. Furthermore, the conditional handovers described in the above embodiments may be a conditional intra-DU (e.g., intra-gNB-DU or intra-eNB-DU) handover. In the conditional intra-DU handover, at least one of the plurality of candidate target cells is a cell served by the same gNB-DU (or eNB-DU) as the source cell. In this case, the UE CONTEXT SETUP REQUEST and UE CONTEXT RESPONSE messages between the CU (e.g., gNB-CU) and DU (e.g., gNB-DU) of the target RAN node may be UE CONTEXT MODIFICATION REQUEST and UE CONTEXT MODIFICATION RESPONSE messages, respectively.

The above-described handover execution condition (e.g., threshold (event) and corresponding time-to-trigger (TTT)) for a conditional handover may be added (or defined) as new events for respective measurement report triggering events (e.g., Event A1, A2, A3, A4, A5, A6, B1, B2, C1, C2, W1, W2, W3, V1, V2, H1, or H2) that have already specified by the 3GPP.

Additionally or alternatively, the above-described handover execution condition for a conditional handover may include a parameter that can be replaced with at least one of the parameters contained in each measurement report triggering event that has already specified by the 3GPP.

Additionally or alternatively, the above-described handover execution condition for a conditional handover may include an offset value for at least one of the plurality of parameters included in each measurement report triggering event that has already specified by the 3GPP.

The parameters included in measurement report triggering events (e.g., Event A1, A2, A3, A4, A5, A6, B1, B2, C1, C2, W1, W2, W3, V1, V2, H1, and H2) that have already specified in the 3GPP may include, for example, but not limited to, at least one of the following:

Ms: the measurement result of the serving cell, not taking into account any offsets; the measurement result of channel busy ratio of a transmission resource pool, not taking into account any offsets; or the Aerial UE height when the radio terminal 3 is Aerial UE, not taking into account any offsets, Hys: the hysteresis value for this event, Thresh (1 or 2): the threshold value for this event, Mn: the measurement result of the neighbour cell, not taking into account any offsets, Ofn: the offset value specific to the frequency of the neighbour cell, Ocn: the cell specific offset of the neighbour cell, Mp: the measurement result of the Primary Cell or the Primary SCG Cell, not taking into account any offsets, Ofp: the offset value specific to the frequency of the Primary Cell or the Primary SCG Cell, Ocp: the cell specific offset of the Primary Cell or the Primary SCG Cell, Off: the offset parameter for this event, Mcr: the measurement result of the CSI-RS (Channel State Information-Reference Signal) resource, not taking into account any offsets, Ocr: the CSI-RS specific offset value for the CSI-RS, Mref: the measurement result of the reference CSI-RS resource, and Oref: the CSI-RS specific offset value for the reference CSI-RS resource.

The User Equipment (UE) in the present disclosure is an entity to be connected to a network via a wireless interface. It should be noted that the radio terminal (UE) in the present disclosure is not limited to a dedicated communication device, and it may be any device as follows having the communication functions herein explained.

The terms "User Equipment (UE)" (as the term is used by 3GPP), "mobile station", "mobile terminal", "mobile device", and "radio terminal (wireless device)" are generally intended to be synonymous with one another. The UE may include standalone mobile stations, such as terminals, cell phones, smartphones, tablets, cellular IoT (internet of things) terminals, and IoT devices. It will be appreciated that the terms "UE" and "radio terminal" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper projecting machinery; chemical machinery; mining and/or construction machinery and/or related equipment; machinery and/or implements for agriculture, forestry and/or fisheries; safety and/or environment preservation equipment; tractors; power transmission equipment; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be an item of trade and/or service industry equipment, a vending machine, an automatic service machine, an office machine or equipment, a consumer electronic and electronic appliance (for example a consumer electronic appliance such as: audio equipment; a speaker; a radio; video equipment; a television etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies. Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked. It will be appreciated that IoT technology can be implemented on any communication devices that can connect to a communications network for sending/receiving data, regardless of whether such communication devices are controlled by human input or software instructions stored in memory. It will be appreciated that IoT devices are sometimes also referred to as Machine-Type Communication (MTC) devices, Machine-to-Machine (M2M) communication devices, or Narrow Band-IoT (NB-IoT) UE.

It will be appreciated that a UE may support one or more IoT or MTC applications.

Some examples of MTC applications are listed in 3GPP TS 22.368 V13.2.0 (2017-01-13), Annex B (the contents of which are incorporated herein by reference). This list is not exhaustive and is intended to be indicative of some examples of MTC applications. In this list, the Service Area of the MTC applications includes Security, Tracking & Tracing, Payment, Health, Remote Maintenance/Control, Metering, and Consumer Devices.

Examples of the MTC applications regarding Security include Surveillance systems, Backup for landline, Control of physical access (e.g., to buildings), and Car/driver security.

Examples of the MTC applications regarding Tacking & Tracing include Fleet Management, Order Management, Telematics insurance: Pay as you drive (PAYD), Asset Tracking, Navigation, Traffic information, Road tolling, and Road traffic optimisation/steering.

Examples of the MTC applications regarding Payment include Point of sales (POS), Vending machines, and Gaming machines.

Examples of the MTC applications regarding Health include Monitoring vital signs, Supporting the aged or handicapped, Web Access Telemedicine points, and Remote diagnostics.

Examples of the MTC applications regarding Remote Maintenance/Control include Sensors, Lighting, Pumps, Valves, Elevator control, Vending machine control, and Vehicle diagnostics.

Examples of the MTC applications regarding Metering include Power, Gas, Water, Heating, Grid control, and Industrial metering.

Examples of the MTC applications regarding Consumer Devices include Digital photo frame, Digital camera, and eBook.

Applications, services, and solutions may be an Mobile Virtual Network Operator (MVNO) service/system, an emergency radio communication service/system, a Private Branch exchange (PBX) service/system, a PHS/Digital Cordless Telecommunications service/system, a Point of sale (POS) service/system, an advertise calling service/system, a Multimedia Broadcast and Multicast Service (MBMS) service/system, a Vehicle to Everything (V2X) service/system, a train radio service/system, a location related service/system, a Disaster/Emergency Wireless Communication Service/system, an Internet of Things (IoT) service/system, a community service/system, a video streaming service/system, a femto cell application service/system, a Voice over LTE (VOLTE) service/system, a radio tag service/system, a charging service/system, a radio on demand service/system, a roaming service/system, an activity monitoring service/system, a telecom carrier/communication NW selection service/system, a functional restriction service/system, a Proof of Concept (PoC) service/system, a personal information management service/system, a display video service/system, a non-communication service/system, an ad-hoc network/Delay Tolerant Networking (DTN) service/system, etc.

The above-described UE categories are merely examples of applications of the technical ideas and embodiments described in the present disclosure. The UE described in this disclosure is not limited to these examples and various modifications can be made thereto by those skilled in the art.

The above-described embodiments are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

(Supplementary Note 1)

A distributed unit of a base station, the distributed unit comprising:
   at least one memory; and
   at least one processor coupled to the at least one memory and configured to send a first message to a central unit of the base station in response to detecting initiation of a conditional mobility of a radio terminal from a first cell served by the distributed unit to a second cell.

(Supplementary Note 2)

The distributed unit according to claim 1, wherein the at least one processor is configured to:
   determine whether a planned mobility of the radio terminal is the conditional mobility; and
   if the planned mobility is the conditional mobility, delay the transmission of the first message to the central unit as compared to a case where the planned mobility is not the conditional mobility.

(Supplementary Note 3)

The distributed unit according to claim 1 or 2, wherein the first message is sent during a signaling procedure for changing a context regarding the radio terminal.

(Supplementary Note 4)

The distributed unit according to claim 3, wherein
   the signaling procedure is a UE Context Modification procedure, and
   the first message is a UE CONTEXT MODIFICATION RESPONSE message.

(Supplementary Note 5)

The distributed unit according to claim 1 or 2, wherein the first message is sent to the central unit to indicate downlink data that is not yet transmitted to the radio terminal.

(Supplementary Note 6)

The distributed unit according to claim 5, wherein the first message is a DOWNLINK DATA DELIVERY STATUS frame.

(Supplementary Note 7)

The distributed unit according to any one of claims 1 to 6, wherein the at least one processor is configured to detect the initiation of the conditional handover by receiving a report that is transmitted from the radio terminal in response to satisfaction of an initiation condition of the conditional mobility.

(Supplementary Note 8)

The distributed unit according to any one of claims 1 to 6, wherein the at least one processor is configured to detect the initiation of the conditional handover by autonomously determining satisfaction of an initiation condition of the conditional mobility.

(Supplementary Note 9)

The distributed unit according to claim 8, wherein the at least one processor is configured to transmit a conditional mobility initiation command to the radio terminal in response to the satisfaction of the initiation condition of the conditional mobility.

(Supplementary Note 10)

The distributed unit according to claim 9, wherein the at least one processor is configured to send to the central unit a configuration for the conditional mobility initiation command, prior to the transmission of the conditional mobility initiation command.

(Supplementary Note 11)

The distributed unit according to any one of claims 1 to 10, wherein the second cell is served by the distributed unit, another distributed unit of the base station, or another base station different from the base station.

(Supplementary Note 12)

A method for a distributed unit of a base station, the method comprising: sending a first message to a central unit of the base station in response to detecting initiation of a conditional mobility of a radio terminal from a first cell served by the distributed unit to a second cell.

(Supplementary Note 13)

The method according to claim 12, further comprising:
determining whether a planned mobility of the radio terminal is the conditional mobility; and
if the planned mobility is the conditional mobility, delaying the transmission of the first message to the central unit as compared to a case where the planned mobility is not the conditional mobility.

(Supplementary Note 14)

The method according to claim 12 or 13, wherein the first message is sent during a signaling procedure for changing a context regarding the radio terminal.

(Supplementary Note 15)

The method according to claim 14, wherein
the signaling procedure is a UE Context Modification procedure, and
the first message is a UE CONTEXT MODIFICATION RESPONSE message.

(Supplementary Note 16)

The method according to claim 12 or 13, wherein the first message is sent to the central unit to indicate downlink data that is not yet transmitted to the radio terminal.

(Supplementary Note 17)

The method according to claim 16, wherein the first message is a DOWNLINK DATA DELIVERY STATUS frame.

(Supplementary Note 18)

The method according to any one of claims 12 to 17, further comprising detecting the initiation of the conditional handover by receiving a report that is transmitted from the radio terminal in response to satisfaction of an initiation condition of the conditional mobility.

(Supplementary Note 19)

The method according to any one of claims 12 to 17, further comprising detecting the initiation of the conditional handover by autonomously determining satisfaction of an initiation condition of the conditional mobility.

(Supplementary Note 20)

A program for causing a computer to perform a method for a distributed unit of a base station, the method comprising:
sending a first message to a central unit of the base station in response to detecting initiation of a conditional mobility of a radio terminal from a first cell served by the distributed unit to a second cell.

(Supplementary Note 21)

A central unit of a base station, the distributed unit comprising:
at least one memory; and
at least one processor coupled to the at least one memory and configured to:
control a conditional mobility of a radio terminal from a first cell served by the distributed unit to a second cell; and
receive from the distributed unit a first message which the distributed unit sends in response to detecting initiation of the conditional mobility.

(Supplementary Note 22)

The central unit according to claim 21, wherein the at least one processor is configured to send, to the distributed unit, information explicitly or implicitly indicating whether a planned mobility of the radio terminal is the conditional mobility.

(Supplementary Note 23)

The central unit according to claim 21 or 22, wherein the at least one processor is configured to know that the conditional mobility of the mobile terminal has been initiated by receiving the first message.

(Supplementary Note 24)

A method for a central unit of a base station, the method comprising:
controlling a conditional mobility of a radio terminal from a first cell served by the distributed unit to a second cell; and
receiving from the distributed unit a first message which the distributed unit sends in response to detecting initiation of the conditional mobility.

(Supplementary Note 25)

A program for causing a computer to perform a method for a central unit of a base station, the method comprising:
controlling a conditional mobility of a radio terminal from a first cell served by the distributed unit to a second cell; and
receiving from the distributed unit a first message which the distributed unit sends in response to detecting initiation of the conditional mobility.

(Supplementary Note 26)
A radio access network node comprising:
at least one memory; and
at least one processor coupled to the at least one memory and configured to:
transmit a conditional mobility initiation command to a radio terminal in response to satisfaction of an initiation condition of a conditional mobility from a first cell served by the radio access network node to a second cell; and
transmit to the radio terminal a configuration for the conditional mobility initiation command, prior to the transmission of the conditional mobility initiation command.

(Supplementary Note 27)
The radio access network node according to claim 26, wherein the at least one processor is configured to:
transmit the configuration to the radio terminal via a master node of dual connectivity; and
transmit the conditional mobility initiation command directly to the radio terminal via a cell served by the radio access network node.

(Supplementary Note 28)
The radio access network node according to claim 26 or 27, wherein
the configuration is transmitted to the radio terminal via a Radio Resource Control (RRC) message, and
the conditional mobility initiation command is transmitted to the radio terminal using signaling in a layer lower than an RRC layer.

(Supplementary Note 29)
The radio access network node according to claim 28, wherein the conditional mobility initiation command is transmitted to the radio terminal using Medium Access Control (MAC) signaling.

(Supplementary Note 30)
The radio access network node according to claim 28 or 29, wherein the conditional mobility initiation command is a MAC Control Element (CE).

(Supplementary Note 31)
The radio access network node according to claim 28, wherein the conditional mobility initiation command is transmitted to the radio terminal using physical-layer signaling.

(Supplementary Note 32)
The radio access network node according to claim 28 or 31, wherein the conditional mobility initiation command is Downlink Control Information (DCI) to be transmitted via a Physical Downlink Control Channel (PDCCH).

(Supplementary Note 33)
The radio access network node according to any one of claims 26 to 32, wherein the configuration indicates one or both of identification information of the conditional mobility initiation command and a resource for transmitting the conditional mobility initiation command.

(Supplementary Note 34)
The radio access network node according to any one of claims 26 to 33, wherein the radio access network node comprises a central unit and at least one distributed unit.

(Supplementary Note 35)
A method for a radio access network node, the method comprising:
transmitting a conditional mobility initiation command to a radio terminal in response to satisfaction of an initiation condition of a conditional mobility from a first cell served by the radio access network node to a second cell; and
transmitting to the radio terminal a configuration for the conditional mobility initiation command, prior to the transmission of the conditional mobility initiation command.

(Supplementary Note 36)
A program for causing a computer to perform a method for a radio access network node, the method comprising:
transmitting a conditional mobility initiation command to a radio terminal in response to satisfaction of an initiation condition of a conditional mobility from a first cell served by the radio access network node to a second cell; and
transmitting to the radio terminal a configuration for the conditional mobility initiation command, prior to the transmission of the conditional mobility initiation command.

This application is based upon and claims the benefit of priority from Japanese Patent Application No. 2019-003562, filed on Jan. 11, 2019, the disclosure of which is incorporated herein in its entirety by reference.

REFERENCE SIGNS LIST

1 Central Unit (CU)
2 Distributed Unit (DU)
3 UE
4 Master Node (MN)
11 CU-CP
12 CU-UP
1702 Processor
1703 Memory
1704 Modules
1804 Processor
1805 Memory
1806 Modules
1903 Baseband Processor
1904 Application Processor
1906 Memory
1907 Modules

The invention claimed is:

1. A method for a User equipment (UE), the method comprising:
based upon access to a target cell, which is one of a plurality of conditional mobility candidate cells, being completed in a conditional mobility from a source gNodeB Distributed Unit (gNB-DU) to a target gNB-DU within a gNB Central Unit (gNB-CU), autonomously releasing a radio resource configuration stored in the UE for each of the plurality of conditional mobility candidate cells other than the target cell.

2. The method according to claim 1, further comprising receiving, from the source gNB-DU, a Radio Resource Control (RRC) Reconfiguration message including information related to an execution condition for the conditional mobility.

3. The method according to claim 2, further comprising performing a random access procedure to the Target gNB-DU if the execution condition for the conditional mobility is satisfied.

4. A User equipment (UE) comprising:
at least one memory; and
at least one processor coupled to the at least one memory and configured to:
based upon access to a target cell, which is one of a plurality of conditional mobility candidate cells, being completed in a conditional mobility from a source gNodeB Distributed Unit (NB-DU) to a target gNB-DU within a gNB Central Unit (gNB-CU), autonomously release a radio resource configuration stored in the UE for each of the plurality of conditional mobility candidate cells other than the target cell.

5. The UE according to claim 4, wherein the at least one processor is further configured to receive, from the source gNB-DU, a Radio Resource Control (RRC) Reconfiguration message including information related to an execution condition for the conditional mobility.

6. The UE according to claim 5, wherein the at least one processor is further configured to perform a random access procedure to the Target gNB-DU if the execution condition for the conditional mobility is satisfied.

* * * * *